(12) United States Patent
Park et al.

(10) Patent No.: US 10,522,818 B2
(45) Date of Patent: Dec. 31, 2019

(54) THREE-DIMENSIONAL ELECTRODE STRUCTURE AND SECONDARY BATTERY INCLUDING THE SAME

(71) Applicant: SAMSUNG ELECTRONICS CO., LTD., Suwon-si, Gyeonggi-do (KR)

(72) Inventors: Hwiyeol Park, Ansan-si (KR); Huisu Jeong, Suwon-si (KR); Kyounghwan Kim, Seoul (KR); Hojung Yang, Suwon-si (KR); Sungjin Lim, Suwon-si (KR); Jin S. Heo, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 252 days.

(21) Appl. No.: 15/725,782

(22) Filed: Oct. 5, 2017

(65) Prior Publication Data

US 2018/0114974 A1 Apr. 26, 2018

(30) Foreign Application Priority Data

Oct. 25, 2016 (KR) ........................ 10-2016-0139283

(51) Int. Cl.
*H01M 4/131* (2010.01)
*H01M 4/70* (2006.01)
*H01M 10/04* (2006.01)
*H01M 10/058* (2010.01)
*H01M 4/13* (2010.01)
(Continued)

(52) U.S. Cl.
CPC ............. *H01M 4/131* (2013.01); *H01M 4/13* (2013.01); *H01M 4/139* (2013.01); *H01M 4/70* (2013.01); *H01M 10/04* (2013.01); *H01M 10/045* (2013.01); *H01M 10/0454* (2013.01); *H01M 10/052* (2013.01); *H01M 10/058* (2013.01); *H01M 10/0562* (2013.01); *H01M 2004/021* (2013.01); *H01M 2004/025* (2013.01)

(58) Field of Classification Search
None
See application file for complete search history.

(56) References Cited

U.S. PATENT DOCUMENTS 9,401,247 B2 7/2016 Tajima et al.
9,451,577 B2 9/2016 Mitsuya et al.
(Continued)

FOREIGN PATENT DOCUMENTS

JP 2012205202 A 10/2012
JP 201377513 A 4/2013
(Continued)

*Primary Examiner* — Alix E Eggerding
(74) *Attorney, Agent, or Firm* — Cantor Colburn LLP

(57) ABSTRACT

A three-dimensional ("3D") electrode structure includes a current collecting layer, a plurality of plates including an active material and disposed on the current collecting layer, and a plurality of inner support layers disposed between the plurality of plates. The plurality of plates includes first, second, and third plates. An inner support layer of the inner support layers is disposed between the first and second plates, and another inner support layer of the inner support layers is disposed between the second and third plates. The inner support layer between the first and second plates and the another inner support layer between the second and third plates are arranged at different positions in a lengthwise direction of the second plate.

24 Claims, 32 Drawing Sheets

(51) Int. Cl.
*H01M 4/139* (2010.01)
*H01M 10/052* (2010.01)
*H01M 10/0562* (2010.01)
*H01M 4/02* (2006.01)

(56) References Cited

U.S. PATENT DOCUMENTS

| | | | |
|---|---|---|---|
| 9,461,300 B2 | 10/2016 | Osada et al. | |
| 2008/0153000 A1* | 6/2008 | Salot | H01M 4/13 |
| | | | 429/218.1 |
| 2009/0142656 A1* | 6/2009 | Nathan | H01M 2/0202 |
| | | | 429/129 |
| 2012/0070734 A1* | 3/2012 | Uetani | H01M 4/13 |
| | | | 429/211 |
| 2014/0023920 A1* | 1/2014 | Yamazaki | H01M 4/133 |
| | | | 429/211 |
| 2014/0057169 A1 | 2/2014 | George et al. | |
| 2016/0126558 A1 | 5/2016 | Lewis et al. | |
| 2016/0204464 A1 | 7/2016 | Cho et al. | |
| 2017/0104235 A1 | 4/2017 | Cho et al. | |
| 2018/0114973 A1* | 4/2018 | Park | H01M 4/0471 |

FOREIGN PATENT DOCUMENTS

| | | |
|---|---|---|
| JP | 201380699 A | 5/2013 |
| JP | 2013254678 A | 12/2013 |
| KR | 1020160085624 A | 7/2016 |
| KR | 1020160088126 A | 7/2016 |
| KR | 1020170042935 A | 4/2017 |

* cited by examiner

< COMPARATIVE EXAMPLE >

< COMPARATIVE EXAMPLE >

< Sintering >

< Washing >

< Sintering >

< Selective Etching >

< Washing >

ABSTRACT# THREE-DIMENSIONAL ELECTRODE STRUCTURE AND SECONDARY BATTERY INCLUDING THE SAME

CROSS-REFERENCE TO RELATED APPLICATION

This application claims priority to Korean Patent Application No. 10-2016-0139283, filed on Oct. 25, 2016, and all the benefits accruing therefrom under 35 U.S.C. § 119, the content of which in its entirety is herein incorporated by reference.

BACKGROUND

1. Field

Embodiments of the disclosure relate to an electrode structure and a battery including the electrode structure.

2. Description of the Related Art

A secondary battery refers to a battery capable of charging and discharging, and has been widely used for various electronic devices such as a mobile phone, a laptop computer, or a camcorder. In particular, a lithium secondary battery exhibiting a high voltage and a high energy density per unit weight, compared to a nickel-cadmium battery or a nickel-hydrogen battery, has been increasingly used.

As types of electronic devices employing secondary batteries have been diversified and related markets have grown, demands for improving performance of secondary batteries in terms of, for example, energy density, rate capability, durability, stability, flexibility, etc. have increased. The energy density is related to an increase in the capacity of a secondary battery, and the rate capability is related to the improvement in a charge rate of a secondary battery.

SUMMARY

Embodiments relate to an electrode structure (a three-dimensional electrode structure) of a secondary battery with enhanced energy density.

Embodiments relate to an electrode structure of a secondary battery with increased capacity and improved structural stability.

Embodiments relate to an electrode structure of a secondary battery with improvement in performance and extension of lifespan.

Embodiments relate to an electrode structure of a secondary battery with improved rate capability.

Embodiments relate to a secondary battery including the electrode structure.

Embodiments relate to a method of manufacturing the electrode structure and the secondary battery.

According to an embodiment, a three-dimensional ("3D") electrode structure includes: a current collecting layer; a plurality of plates electrically connected to the current collecting layer, where the plurality of plates is disposed vertically on the current collecting layer, and includes an active material; and a plurality of inner support layers disposed between the plurality of plates, in which the plurality of plates includes first, second, and third plates. In such an embodiment, an inner support layer of the plurality of inner support layers is disposed between the first and second plates, another inner support layer of the plurality of inner support layers is disposed between the second and third plates, and the inner support layer between the first and second plates and the another inner support layer between the second and third plates are arranged at different positions in a lengthwise direction of the second plate.

In an embodiment, the plurality of inner support layers may include a first inner support layer disposed between the first and second plates and a second inner support layer disposed between the second and third plates, and no inner support layer may be arranged at a position corresponding to the first inner support layer in an area between the second and third plates.

In an embodiment, the plurality of inner support layers may further include a third inner support layer disposed between the first and second plates and spaced apart from the first inner support layer, the second inner support layer may be arranged at a position between the second and third plates corresponding to an area between the first and third inner support layers, and no inner support layer may be arranged between the first and third inner support layers in an area between the first and second plates.

In an embodiment, the plurality of plates may further include a fourth plate, another inner support layer of the plurality of inner support layers may be disposed between the third and fourth plates, the another inner support layer between the third and fourth plates may be arranged at a position corresponding to the inner support layer between the first and second plates in a lengthwise direction of the plurality of plates, and an imaginary straight line connecting a center of the inner support layer between the first and second plates and a center of the another inner support layer between the third and fourth plates may be perpendicular to the plurality of plates.

In an embodiment, the plurality of plates may further include a fourth plate, another inner support layer of inner support layers may be disposed between the third and fourth plates, the another inner support layer between the third and fourth plates may be arranged to be shifted with respect to the inner support layer between the first and second plates in a lengthwise direction of the plurality of plates, and an imaginary straight line connecting a center of the inner support layer between the first and second plates and a center of the another inner support layer between the third and fourth plates may be inclined to the plurality of plates.

In an embodiment, the imaginary straight line connecting the center of the inner support layer between the first and second plates and the center of the another inner support layer between the third and fourth plates may be inclined by an angle with respect to the first plate, the angle may satisfy the following inequality: 70°≤θ≤90°, where θ denotes the angle.

In an embodiment, the plurality of inner support layers are arranged to form a plurality of columns, and about 50% or more of the inner support layers in an n-th column of the plurality of columns may not overlap the inner support layers in an (n+1)-th column of the plurality of columns in a lateral direction perpendicular to the plurality of columns.

In an embodiment, the plurality of inner support layers may be arranged to form a plurality of columns, and about 50% or more of the inner support layers in an n-th column of the plurality of columns may not be overlapped with the inner support layers in an (n+2)-th column of the plurality of columns in a lateral direction perpendicular to the plurality of columns.

In an embodiment, each of the plurality of plates may have a thickness in a range of about 5 micrometers (μm) to about 100 μm.

In an embodiment, each of the plurality of plates may have a length in a range of about 3 millimeters (mm) to about 30 mm and/or a height in a range of about 50 μm to about 1,000 μm.

In an embodiment, the plurality of plates may be arranged with an interval of about 1 μm to about 100 μm.

In an embodiment, each of the plurality of inner support layers may have a thickness in a range of about 5 μm to about 50 μm.

In an embodiment, the plurality of inner support layers may be arranged with an interval in a range of about 100 μm to about 1,000 μm in a lengthwise direction of the plurality of plates.

In an embodiment, the plurality of plates may include a cathode active material and the 3D electrode structure may be a cathode structure.

In an embodiment, each of the plurality of plates may include an inner current collecting layer disposed in an inner portion thereof, and the inner current collecting layer may be electrically connected to the current collecting layer.

In an embodiment, the plurality of inner support layers may include an active material having a composition, which is the same as or different from an active material of the plurality of plates, or a non-active material.

In an embodiment, each of the plurality of inner support layers may include an inner current collecting layer in an inner portion thereof, and the inner current collecting layer may be electrically connected to the current collecting layer.

In an embodiment, the 3D electrode structure may further a partition wall disposed vertically on the current collecting layer and arranged perpendicular to the plurality of plates to support the plurality of plates, and the partition wall may be disposed outside the plurality of plates.

In an embodiment, the 3D electrode structure may further include a base layer including an active material and disposed between the current collecting layer and the plurality of plates.

In an embodiment, the base layer may include an active material-metal sintered composite, the active material-metal sintered composite may include at least one selected from Al, Cu, Ni, Co, Cr, W, Mo, Ag, Au, Pt and Pd, and a content of the metal in the active material-metal sintered composite may be about 1 vol % to about 30 vol %.

According to another embodiment, a secondary battery includes a first electrode structure, a second electrode structure arranged spaced apart from the first electrode structure, and an electrolyte disposed between the first electrode structure and the second electrode structure, in which the first electrode structure may include the above-mentioned 3D electrode structure.

In an embodiment, the first electrode structure may be a cathode structure, and the second electrode structure may be an anode structure.

In an embodiment, the first electrode structure may include a plurality of first plates including a first active material, and the second electrode structure may include a plurality of second plates including a second active material, and the plurality of first plates and the plurality of second plates may be alternately arranged with each other.

In an embodiment, the first electrode structure, the electrolyte and the second electrode structure constitute a battery cell, and the secondary battery may have a structure in which a plurality of the battery cells may be stacked on one another.

BRIEF DESCRIPTION OF THE DRAWINGS

These and/or other features will become apparent and more readily appreciated from the following description of the embodiments, taken in conjunction with the accompanying drawings, in which.

DETAILED DESCRIPTION

Figure 1:
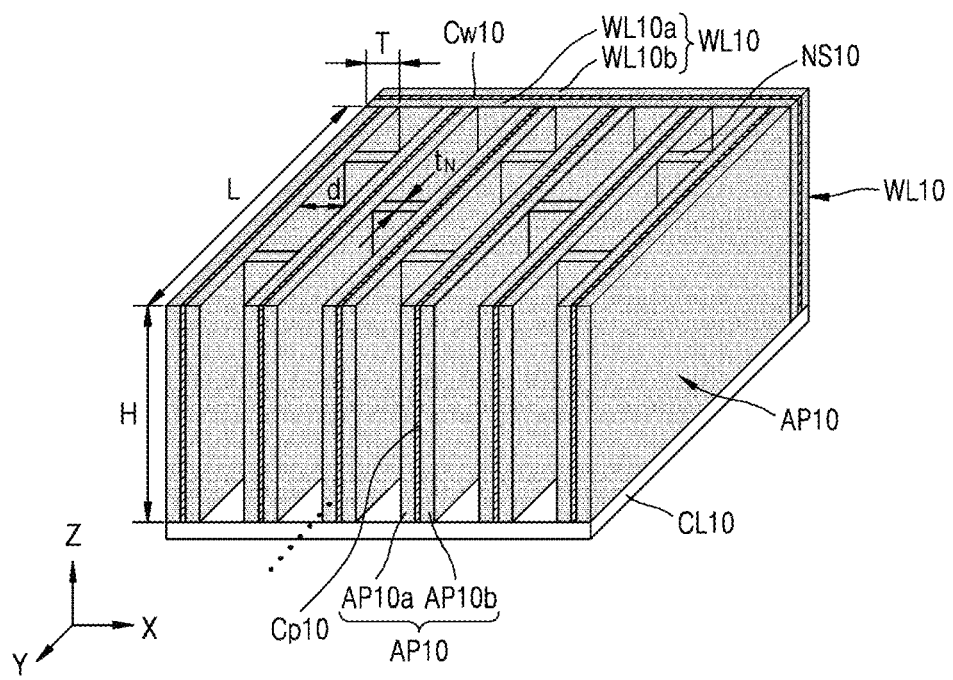
FIG. 1 is a perspective view of a three-dimensional ("3D") electrode structure according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings thereof.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Exemplary embodiments are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, exemplary embodiments of a three-dimensional ("3D") electrode structure, a secondary battery including the 3D electrode structure, and a method of manufacturing the 3D electrode structure and the second battery will be described in detail with reference to the accompanying drawings.

FIG. 1 is a perspective view of a 3D electrode structure according to an embodiment.

Referring to FIG. 1, an embodiment of the 3D electrode structure includes a current collecting layer CL10. The current collecting layer CL10 may be a first electrode current collector, for example, a cathode current collector. The current collecting layer CL10 may have a plate shape. In such an embodiment, the current collecting layer CL10 may be referred to as a current collecting plate.

The 3D electrode structure further includes a plurality of active material plates AP10 vertically arranged with the current collecting layer CL10 and electrically connected to the current collecting layer CL10. The active material plates AP10 may be arranged perpendicular to a surface of the current collecting layer CL10. The active material plates AP10 may be arranged spaced apart from each other at a predetermined interval d and parallel to each other. The active material plates AP10 may be, for example, cathode active material plates. An inner current collecting layer (hereinafter, referred to as the inner current collector) Cp10 may be provided in each of the active material plates AP10. In such an embodiment, each of the active material plates AP10 may include the inner current collector Cp10 therein. Each of the active material plates AP10 may be divided into two parts AP10a and AP10b by the inner current collector Cp10. In such an embodiment, a first plate part AP10a may be disposed on a surface of the inner current collector Cp10 and a second plate part AP10b may be disposed on an opposing surface of the inner current collector Cp10. In an embodiment, as shown in FIG. 1, the inner current collector Cp10 may have a same height as the active material plates AP10, but not being limited thereto. In an alternative embodiment, the inner current collector Cp10 may have a height lower than the active material plates AP10. A height H, a length L and a thickness (width) T of each of the active material plates AP10 may be defined as those illustrated in the drawings. As shown in FIG. 1, the height H may be defined as a length in a Z-axis direction, the length L may be defined as a length in a Y-axis direction, and the thickness T may be defined as a length in an X-axis direction. Here, the X-axis and Y-axis may define a plane in which the current collecting layer CL10 (e.g., the largest surface of the current collecting layer CL10) is disposed. A ratio of the height H to the thickness T may be referred to as an aspect ratio ("AR").

In an embodiment, the 3D electrode structure includes a plurality of inner support layers NS10 between the plurality of active material plates AP10. The inner support layers NS10 may be disposed or arranged between the active material plates AP10 to support the active material plates AP10. The inner support layers NS10 may be disposed perpendicular to (or, substantially perpendicular to) the active material plates AP10. Opposing surfaces of each of the inner support layers NS10 may contact side surfaces of the two neighboring active material plates AP10 facing each other. In such an embodiment, a thickness $t_N$ of each of the inner support layers NS10 may be a width thereof in a direction along the length L of the active material plates AP10, e.g., the Y-axis direction. A length of each of the inner support layers NS10 may correspond to an interval d between the active material plates AP10. A height of each of the inner support layers NS10 may correspond to the height H of each of the active material plates AP10. The arrangement/array of the inner support layers NS10 will be described later in greater detail with reference to FIGS. 7 and 8.

In an embodiment, a partition wall WL10 for supporting the active material plates AP10 may be further disposed on the current collecting layer CL10. The partition wall WL10 may be arranged perpendicular to, or substantially perpendicular to, the active material plates AP10. The partition wall WL10 may be a type of a supporting plate or a supporting layer. The partition wall WL10 may be arranged to support the active material plates AP10 from an outside of the active material plates AP10. In such an embodiment, the partition wall WL10 may be referred to as an "outer support layer". The partition wall WL10 may optionally include an inner current collecting layer (hereinafter, referred to as the partition-wall current collecting layer) Cw10. In an embodiment, as shown in FIG. 1, the partition wall WL10 includes the partition-wall current collecting layer Cw10. In such an embodiment, the partition wall WL10 may be divided into two parts WL10a and WL10b by the partition-wall current collecting layer Cw10. In such an embodiment, a first partition wall part WL10a may be disposed on a surface of the partition-wall current collecting layer Cw10, and a second partition wall part WL10b may be disposed on an opposing surface of the partition-wall current collecting layer Cw10. In an embodiment, the partition-wall current collecting layer Cw10 may have a same height as the partition wall WL10, but not being limited thereto. In an alternative embodiment, the partition-wall current collecting layer Cw10 may have a height lower than the partition wall WL10. In an alternative embodiment, although it is not illustrated, another partition wall facing the partition wall WL10 may be further disposed on the current collecting layer CL10, and the active material plates AP10 may be disposed between the first partition wall WL10 and the second partition wall.

Each of the active material plates AP10 may have a thickness (width) T of about 5 micrometers (μm) or more. In one embodiment, for example, the thickness T may be in a range of about 5 μm to about 100 μm. Each of the active material plates AP10 may have a height H of about 50 μm or more. In one embodiment, for example, the height H may be in a range of about 50 μm to about 1,000 μm. A ratio of the height H to the thickness T of the active material plates AP10, that is, the AR, may be, for example, about 10 or more, about 12 or more, or about 15 or more. Each of the active material plates AP10 may have the length L of about 2 millimeters (mm) or more, or about 3 mm or more. In one embodiment, for example, the length L of each of the active material plates AP10 may be in a range of about 3 mm to about 30 mm. In an alternative embodiment, the length L of each of the active material plates AP10 may be greater than 30 mm. Each of the inner support layers NS10 may have the thickness $t_N$ of about 5 μm or more. In one embodiment, for example, the thickness $t_N$ of the inner support layers NS10 may be in a range of about 5 μm to about 50 μm. Each of the inner support layers NS10 may have a length of about 1 μm or more, or about 5 μm or more. In one embodiment, for example, the length of the inner support layers NS10 may be in a range of about 1 μm to about 100 μm, or in a range of about 5 μm to about 100 μm. The length of each of the inner support layers NS10 may correspond to the interval d of the active material plates AP10. Accordingly, the interval d of the active material plates AP10 may be in a range of about 1 μm to about 100 μm, or in a range of about 5 μm to about 100 μm. The inner support layers NS10 may be arranged with an interval of several tens of micrometers or more in the direction along the length L of the active material plates AP10. In one embodiment, for example, the inner support layers NS10 may be arranged with an interval of about 100 μm to about 1,000 μm in the direction along the length L of the active material plates AP10, or the Y-axis direction. According an the embodiment, the structural stability of the 3D electrode structure is high such that the height H and the length L of the active material plates AP10 may be easily increased, the number of the active material plates AP10 may be easily increased, and the interval d of the active material plates AP10 may be easily controlled. In such an embodiment, various effects such as a high energy density, high capacity, and high stability may be obtained. However, the length L, the height H and the thickness T of each of the active material plates AP10 and the thickness $t_N$, the length, that is, d, and the interval of each of the inner support layers NS10, which are presented above, are merely exemplary and may be variously modified as desired.

Hereinafter, materials and structures of the current collecting layer CL10, the active material plates AP10, the inner current collectors Cp10, the inner support layers NS10, the partition wall WL10, and the partition-wall current collecting layer Cw10 will be described in greater detail.

In an embodiment, the current collecting layer CL10 may include at least one of conductive materials, for example, Cu, Au, Pt, Ag, Zn, Al, Mg, Ti, Fe, Co, Ni, Ge, In, and Pd. The current collecting layer CL10 may be a metal layer or a layer formed of a conductive material other than a metal.

The active material plates AP10 may include a cathode active material. In one embodiment, for example, the active material plates AP10 may include a Li-containing oxide. The Li-containing oxide may be an oxide including Li and a transition metal. The Li-containing oxide may be, for example, $LiMO_2$, where M denotes a metal. The M may be Co, Ni, Mn or a combination of two or more thereof. In one embodiment, for example, $LiMO_2$ may be $LiCoO_2$. The cathode active material may include a ceramic of a cathode composition, and may be polycrystal or single crystal. However, the materials of the cathode active material described above are merely exemplary and other cathode active materials may be used. The inner current collector Cp10 may be formed of a material that is the same as or similar to the material of the current collecting layer CL10. In one embodiment, for example, the inner current collector Cp10 may include at least one of conductive materials, for example, Cu, Au, Pt, Ag, Zn, Al, Mg, Ti, Fe, Co, Ni, Ge, In, and Pd.

In an embodiment, the inner support layers NS10 may include an active material having a composition that is the same as, or different from, that of the active material of the active material plates AP10. Alternatively, the inner support layers NS10 may be formed of a non-active material. In an embodiment, the partition wall WL10 may include an active material having a composition that is the same as or different from the active material of the active material plates AP10. In such an embodiment, the first and second partition wall parts WL10a and WL10b may include an active material having a composition that is the same as, or different from, that of the active material of the active material plates AP10. The material of the partition-wall current collecting layer Cw10 may be the same as or similar to that of the inner current collector Cp10. In some embodiments, the partition wall WL10 may be formed of a non-active material and, in such embodiment, the partition-wall current collecting layer Cw10 may be omitted.

In an embodiment, the 3D electrode structure may be a "3D cathode structure". In such an embodiment, the current collecting layer CL10 is a cathode current collector layer, and the active material plates AP10 may be a cathode active material plate. In an embodiment, where the partition wall WL10 includes an active material, the active material may be a cathode active material.

In an embodiment, an electrode structure has a 3D structure in which the active material plates AP10 are disposed on the current collecting layer CL10 perpendicularly (or substantially perpendicularly) thereto, such that capacity and energy density may be substantially increased compared to a two-dimensional ("2D") electrode structure, that is, a planar type structure. In such an embodiment, the 3D electrode structure may secure a high active material volume fraction and a large reaction area, compared to the planar type electrode structure, such that energy density and rate capability of a secondary battery may be enhanced.

In an embodiment, where the inner support layers NS10 include an active material, the inner support layers NS10 may support the active material plates AP10 and simultaneously contribute to a battery reaction similar to the active material plates AP10. In an embodiment, the partition wall WL10 may contribute to a battery reaction while supporting the active material plates AP10. Accordingly, the inner support layers NS10 and the partition wall WL10 may increase structural stability of an electrode structure and simultaneously expand a reaction area. When the inner support layers NS10 are used, compared to a structure without the inner support layers NS10, the active material volume fraction increases in the 3D electrode structure and thus it is further advantageous to the increase of energy density.

Figure 2:
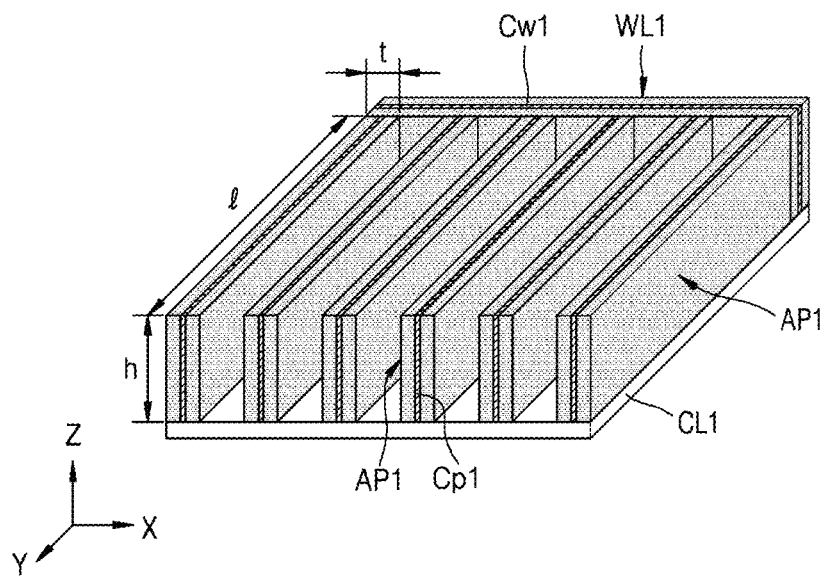
FIG. 2 is a perspective view of an electrode structure according to a comparative example.

FIG. 2 is a perspective view of an electrode structure according to a comparative example.

Referring to FIG. 2, the electrode structure according to the comparative example may include a current collecting layer CL1 and a plurality of active material plates AP1 provided on a surface thereof. A partition wall WL1 for supporting the active material plates AP1 may be provided on the current collecting layer CL1. An inner current collector Cp1 may be provided in the active material plates AP1, and a partition-wall current collecting layer Cw1 may be provided in the partition wall WL1.

The electrode structure according to the comparative example does not include the inner support layers NS10, unlike the electrode structure of FIG. 1. Accordingly, it is difficult to increase the height h of each of the active material plates AP1, and furthermore, it is difficult to increase the length l of each of the active material plates AP1. When the height h or the length l of each of the active material plates AP1 is increased, the active material plates AP1 may be bent or collapsed. Furthermore, an interval between the active material plates AP1 may be irregular. Accordingly, it may be difficult to implement the active material plates AP1 having a high AR (a ratio of height h to thickness t). Furthermore, it may be difficult to increase a length of the electrode structure. As a result, it may be difficult for the electrode structure according to the comparative example to implement a high energy density and secure structural stability.

Figure 3:
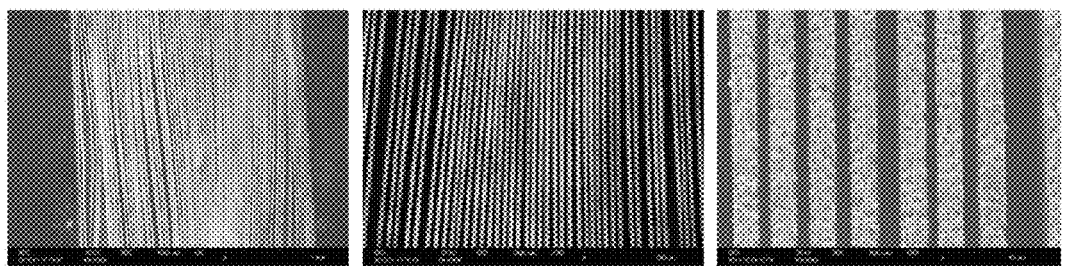
FIG. 3 is scanning electron microscope ("SEM") images showing problems of an electrode structure according to a comparative example corresponding to the structure of FIG. 2.

FIG. 3 is scanning electron microscope ("SEM") images showing problems of the electrode structure according to the comparative example corresponding to the structure of FIG. 2. FIG. 3 includes SEM images of the active material plates of the electrode structure according to a comparative example, formed in various conditions, image-captured from thereabove, that is, in a top view.

Referring to FIG. 3, in the electrode structure according to the comparative example, problems that the active material plates are bent or collapsed or the interval between the active material plates is irregular may occur. Due to the above problems, it may be difficult to perform a process of forming an electrolyte and an anode active material on the electrode structure (cathode structure). Also, even when a battery cell is formed using the electrode structure according to the comparative example, due to an irregular reaction and an instable structure, performance of a battery may be deteriorated and lifespan of the battery may be shortened.

In an embodiment of the invention, as shown in FIG. 1, the 3D electrode structure includes the inner support layers NS10, the height H and the length L of the active material plates AP10 may be easily increased so that the active material plates AP10 having a high AR may be implemented. In such an embodiment, the interval between the active material plates AP10 may be controlled to be uniform (or relatively uniformly). Accordingly, in such an embodiment, a high energy density and high rate capability may be obtained, and the reaction uniformity and structural stability may be improved. Furthermore, in such an embodiment, since the inner support layers NS10 restrict a deformation problem according to a change (expansion/contraction) in the volume of the active material during the operation of a battery, durability and lifespan of the battery may be improved.

Figure 4:
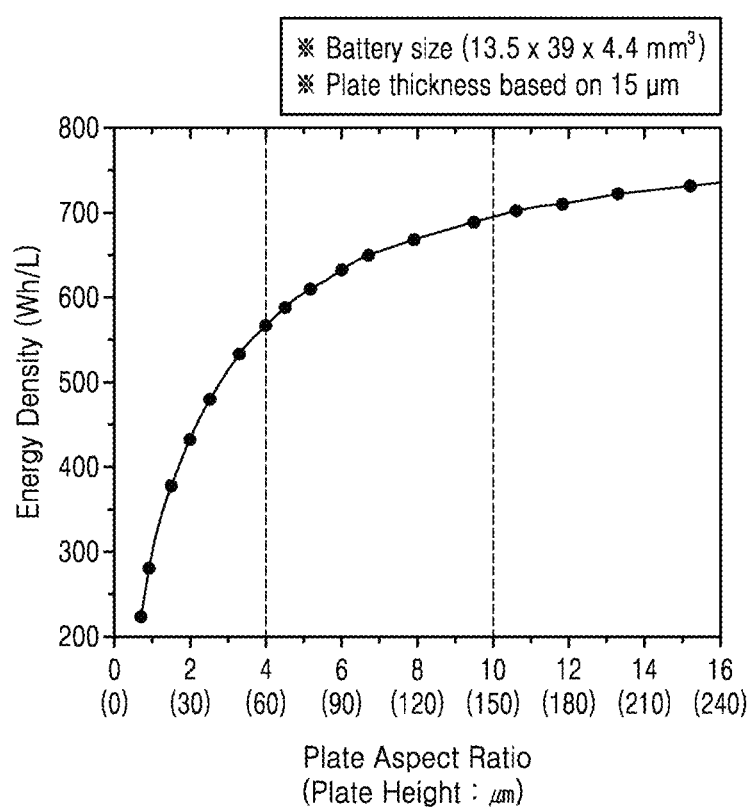
FIG. 4 is a graph showing a change in energy density according to an aspect ratio of a plurality of active material plates in a 3D electrode structure.

FIG. 4 is a graph showing a change in energy density according to the AR of the active material plates in a 3D electrode structure. The energy density is an energy density of a secondary battery employing the 3D electrode structure. It is assumed that the size of the secondary battery is 13.5×39×4.4 mm$^3$ and the thickness of the active material plate is 15 µm. The numbers in parentheses under the AR on an X-axis of FIG. 4 denote the height (µm) of the active material plate.

As shown in FIG. 4, as the AR of a plurality of active material plates increases, the energy density of a secondary battery increases. Since it is difficult to obtain an AR of 4 or more with the structure of FIG. 2 according to a comparative example, it may be also difficult to obtain a high energy density. However, when a secondary battery includes an embodiment of the electrode described above with reference to FIG. 1, a high AR of 10 or more or 12 or more may be implemented. Accordingly, in a secondary battery including an embodiment of the electrode described above with reference to FIG. 1, a high energy density of about 650 Watt-hours per liter (Wh/L) or more, or about 700 Wh/L or more, may be obtained.

Figure 5:
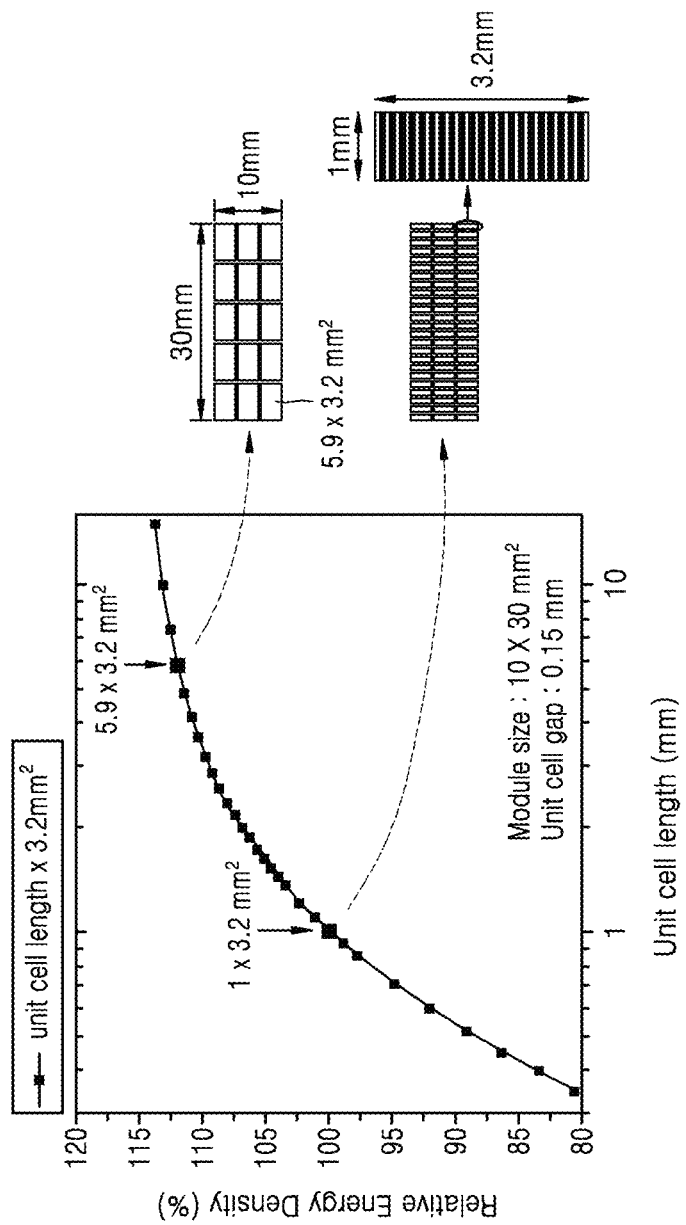
FIG. 5 is a graph showing a change in relative energy density (%) regarding a module according to a length of a unit cell, where the module is formed by using a plurality of unit cells (battery cells) employing a 3D electrode structure.

FIG. 5 is a graph showing a change in relative energy density (%) regarding a module according to a length of a unit cell, where the module is formed by using a plurality of unit cells (battery cells) employing a 3D electrode structure. The size of the module is 10×30 mm$^2$, and an interval between the plurality of unit cells forming the module is about 0.15 mm. As the length of the unit cell increases, the number of unit cells forming the module decreases.

As shown in FIG. 5, as the length of the unit cell increases, the relative energy density increases. When the size of the unit cell is 1×3.2 mm$^2$, for example, the relative energy density is about 100%, and when the size of the unit cell is 5.9×3.2 mm$^2$, the relative energy density is about 112%. In other words, as the length of the active material plate increases from 1 mm to 5.9 mm, the relative energy density may be increased by about 12%. Accordingly, the energy density of a secondary battery may be increased by increasing the length of a unit cell, that is, the length of the active material plate, by using the inner support layers NS10 as in an embodiment shown in FIG. 1. As described above, it may be difficult to increase the length of a unit cell, that is, the length of the active material plate, to 1 mm or more, with the structure of FIG. 2 according to a comparative example. However, when the structure according to an embodiment of the invention is used, the length of a unit cell, that is, the length of the active material plate, may be effectively increased to be about 3 mm or more, or about 10 mm or more. As a result, the energy density of a secondary battery may be increased. When the AR is increased by increasing the height of the active material plate and simultaneously the length of the active material plate is increased, both effects may be obtained and thus the energy density of a secondary battery may be further improved.

The structure of FIG. 1 may correspond to a part of the 3D electrode structure that is applicable to a single unit cell (battery cell) area. The entire structure of the 3D electrode structure applicable to an entire single unit cell (battery cell) area will be described later in detail with reference to FIG. 6.

Figure 6:
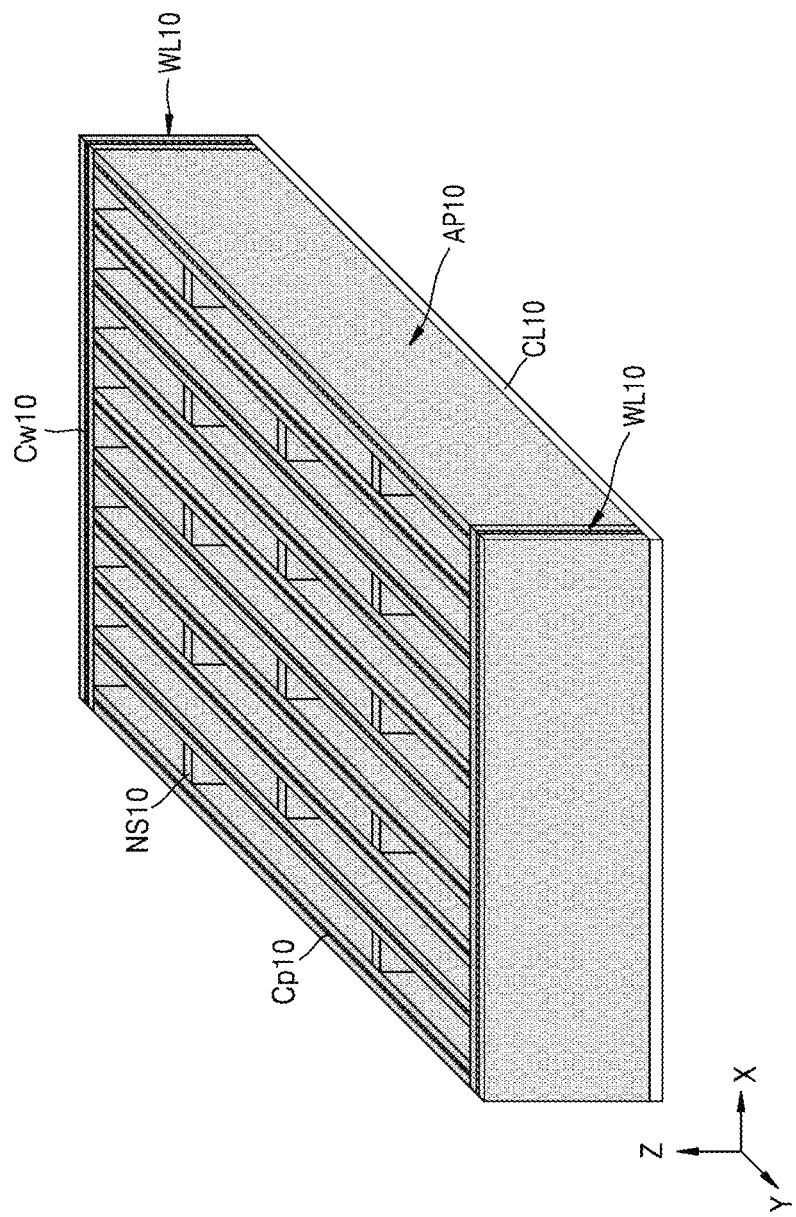
FIG. 6 is a perspective view of a 3D electrode structure according to another embodiment.

FIG. 6 is a perspective view of a 3D electrode structure according to another embodiment.

Referring to FIG. 6, an embodiment of a 3D electrode structure includes a plurality of partition walls WL10 disposed on the current collecting layer CL10 to be spaced apart from each other in a predetermined direction, for example, in the Y-axis direction. In one embodiment, for example, two partition walls WL10 may be spaced apart from each other. In such an embodiment, the active material plates AP10 may be disposed between the two partition walls WL10. The inner current collector Cp10 may be provided in each of the active material plates AP10, and the partition-wall current collecting layer Cw10 may be included in each of the partition walls WL10. The inner support layers NS10 may be disposed between the active material plates AP10. The materials and properties of the current collecting layer CL10, the active material plates AP10, the inner current collector Cp10, the inner support layers NS10, the partition wall WL10 and the partition-wall current collecting layer Cw10 may be the same as or similar to those of the current collecting layer CL10, the active material plates AP10, the inner current collector Cp10, the inner support layers NS10, the partition wall WL10 and the partition-wall current collecting layer Cw10 described above with reference to FIG. 1. The arrangement structure illustrated in FIG. 6 is merely exemplary and may be extended or repeated in a certain direction or may be modified in various ways. In one embodiment, for example, at least three partition walls may be disposed to be spaced apart from one another in the Y-axis direction, and a plurality of active material plates and a plurality of inner support layers may be disposed between the partition walls. Furthermore, the number and arrangement of the inner support layers NS10 of FIG. 6 are exemplary and may be modified in various ways.

Figure 7:
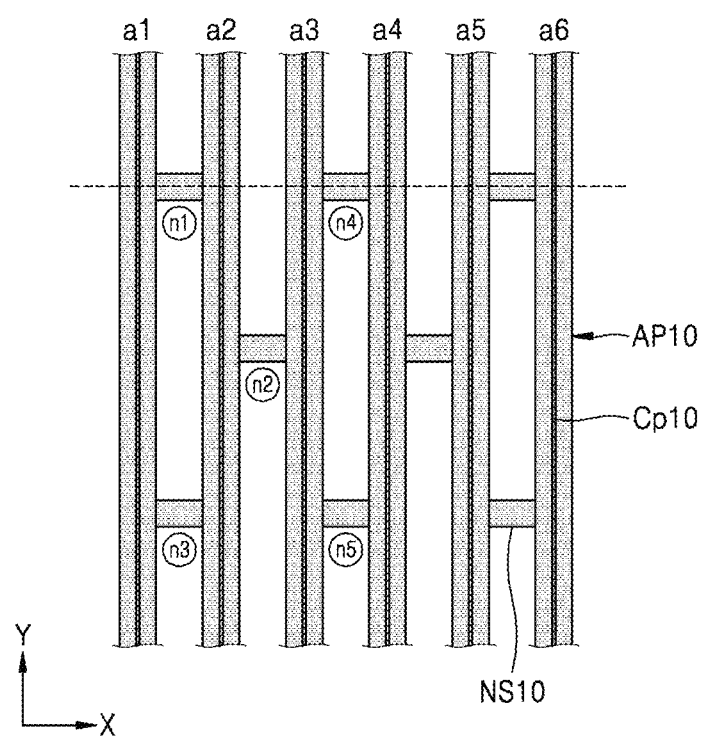
FIG. 7 is a plan view of an array of a plurality of active material plates and a plurality of inner support layers of a 3D electrode structure according to an embodiment.

FIG. 7 is a plan view of an array of the active material plates AP10 and the inner support layers NS10 of a 3D electrode structure according to an embodiment.

Referring to FIG. 7, in an embodiment, the active material plates AP10 may include, for example, first to sixth active material plates a1 to a6. The active material plates AP10 may extend in the Y-axis direction and may be arranged spaced apart in an X-axis direction. The inner support layers NS10 may be disposed between the active material plates AP10. The inner support layers NS10 may have a separate layer structure from the active material plates AP10. In an embodiment, the inner support layers NS10 may be a separate layer without forming a single unitary body with the active material plates AP10. Accordingly, in such an embodiment, the inner support layers NS10 may be allowed to include a different material, or have a different layer structure, from the material/structure of the active material plates AP10.

At least one inner support layer, e.g., a first or third inner support layer n1 or n3, between the first plate a1 and the second plate a2 and at least one inner support layer, e.g., a second inner support layer n2, between the second plate a2 and the third plate a3 may be arranged at different positions in a lengthwise direction of the second plate a2. When the inner support layers NS10 include the first inner support layer n1 between the first and second plates a1 and a2 and the second inner support layer n2 between the second and third plates a2 and a3, no inner support layer may be in an area between the second and third plates a2 and a3 at a position corresponding to the first inner support layer n1. In such an embodiment, no inner support layer may be in an area between the first and second plates a1 and a2 at a position corresponding to the second inner support layer n2.

When the inner support layers NS10 further includes the third inner support layer n3 spaced apart from the first inner support layer n1 between the first and second plates a1 and a2, the second inner support layer n2 may be disposed between first and third the inner support layers n1 and n3 in a lengthwise direction of the second plate a2. In such an embodiment, no inner support layer may be disposed the first and third inner support layers n1 and n3 in an area between the first and second plates a1 and a2.

The arrangement of at least one of the inner support layers n1 and n3 provided between the first and second plates a1 and a2 may be identically or similarly repeated in an area between the third and fourth plates a3 and a4. Furthermore, the arrangement of at least one inner support layer n2 provided between the second and third plates a2 and a3 may be identically or similarly repeated in an area between the fourth and fifth plates a4 and a5.

At least one inner support layer n4 and n5 between the third and fourth plates a3 and a4 may be arranged at a position corresponding to the at least one inner support layer n1 and n3 between the first and second plates a1 and a2 in a lengthwise direction of the active material plates AP10. An imaginary straight line connecting a center of the first inner support layer n1 between the first and second plates a1 and a2 and a center of the fourth inner support layer n4 between the third and fourth plates a3 and a4 may be perpendicular to the active material plates AP10.

The arrangement of the inner support layers n1 to n5 between the first and second plates a1 and a2, between the second and third plates a2 and a3, and between the third and fourth plates a3 and a4 may be repeated in the X-axis direction and the Y-axis direction.

Figure 8:
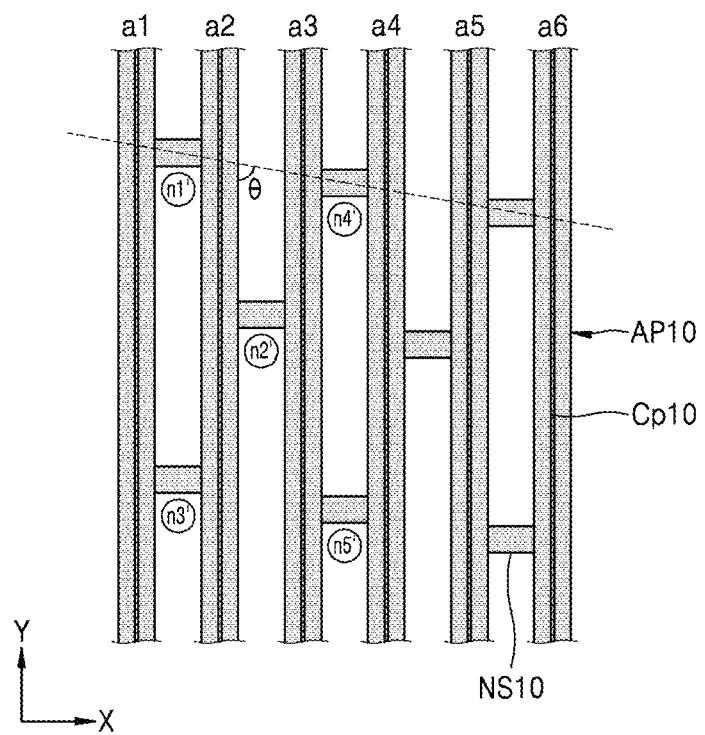
FIG. 8 is a plan view of an array of a plurality of active material plates and a plurality of inner support layers of a 3D electrode structure according to an alternative embodiment.

FIG. 8 is a plan view of an array of the active material plates AP10 and the inner support layers NS10 of a 3D electrode structure according to an alternative embodiment. In the 3D electrode structure of the embodiment, the inner support layers NS10 may have an arrangement modified from that of FIG. 7.

In an embodiment, at least one inner support layer, e.g., a first or third inner support layer n1' or n3', between the first plate a1 and the second plate a2 and at least one inner support layer, e.g., a second inner support layer n2', between the second plate a2 and the third plate a3 may be arranged at different positions in a lengthwise direction of the second plate a2. Referring to FIG. 8, at least one inner support layer n4' and n5' between the third and fourth plates a3 and a4 may be arranged to be shifted to a degree in the lengthwise direction of the active material plates AP10 with respect to at least one inner support layer n1' and n3' between the first and second plates a1 and a2. An imaginary straight line connecting between a center of the first inner support layer n1' between the first and second plates a1 and a2 and a center of the fourth inner support layer n4' between the third and fourth plates a3 and a4 may be inclined by a certain angle θ with respect to the active material plates AP10. The imaginary straight line connecting the center of the first inner support layer n1' and the center of the fourth inner support layer n4' may be inclined by the angle θ with respect to the active material plates AP10. In such an embodiment, the angle θ may satisfy the following inequality: $70°≤θ≤90°$, but not being limited thereto. Alternatively, the angle θ may be less than 70°.

In an embodiment, the plurality of inner support layers NS10 may not substantially overlap each other in the X-axis direction. In such an embodiment, stress that may be generated from the electrode structure by the inner support layers NS10 may be reduced. Accordingly, the structural stability of the electrode structure and operational properties of a battery employing the electrode structure may be improved. However, in some alternative embodiment, some of the inner support layers NS10 may overlap each other in the X-axis direction. When a ratio of the inner support layers NS10 that overlap each other is not high, that is, a ratio of the inner support layers NS10 that do not overlap each other is relatively high, a stress reduction effect may be obtained by the shift arrangement. In such an embodiment, a ratio of the inner support layers NS10 that do not overlap each other in the X-axis direction may be about 50% or more, or about 70% or more.

The inner support layers NS10 may be arranged along a plurality of columns. The columns may be arranged between the active material plates AP10. About 50% or more or about 70% or more of the inner support layers in an n-th column may not overlap the inner support layers in an (n+1)-th column in the X-axis direction. In such an embodiment, about 50% or more or about 70% or more of inner support layers in the (n+1)th column may not overlap the inner support layers in an (n+2)-th column in the X-axis direction. In such an embodiment, about 50% or more or about 70% or more of the inner support layers in the n-th column may not overlap the inner support layers in the (n+2)-th column in the X-axis direction. However, in an alternative embodiment, as shown in FIG. 7, the inner support layers in an n-th column may substantially overlap the inner support layers in the (n+2)-th column.

Figure 9:
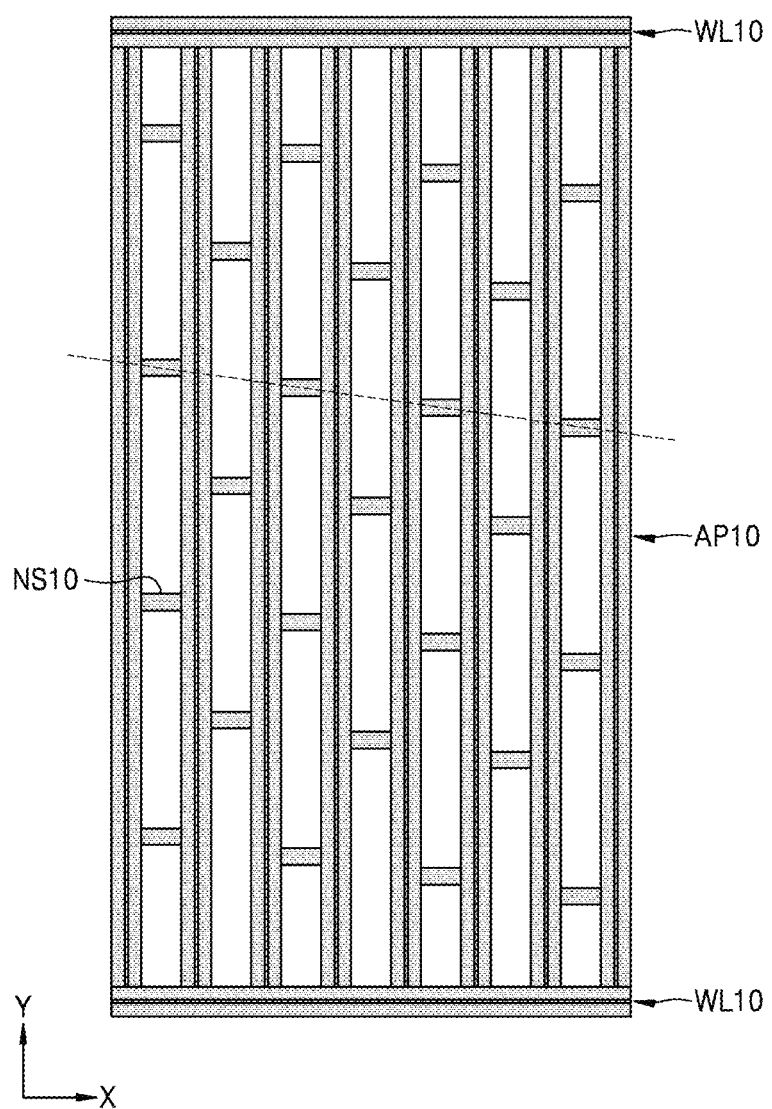
FIG. 9 is a plan view illustrating an planar structure of a 3D electrode structure according to another alternative embodiment.

FIG. 9 is a plan view illustrating a planar structure of a 3D electrode structure according to an embodiment. FIGS. 10 to 16 are perspective views of other alternative embodiment of a 3D electrode structure. The structures of FIGS. 9 to 16 may partially correspond to the embodiment of FIG. 8.

Referring to FIG. 9, in an embodiment, the two partition walls WL10 may be arranged spaced apart from each other, and the active material plates AP10 may be provided between the two partition walls WL10. The active material plates AP10 may be arranged perpendicular to the partition walls WL10. The inner support layers NS10 may be disposed between the active material plates AP10. The inner support layers NS10 may be arranged perpendicular to the active material plates AP10. The arrangement of the inner support layers NS10 may be identical or similar to the arrangement described in FIG. 8. Accordingly, the inner support layers NS10 may not substantially overlap each other in the X-axis direction.

Alternatively, although it is not illustrated, the inner support layers NS10 may be randomly or irregularly arranged. In such an embodiment, some of the inner support layers NS10 may have the arrangement described with reference to FIG. 7 or 8.

Figure 10:
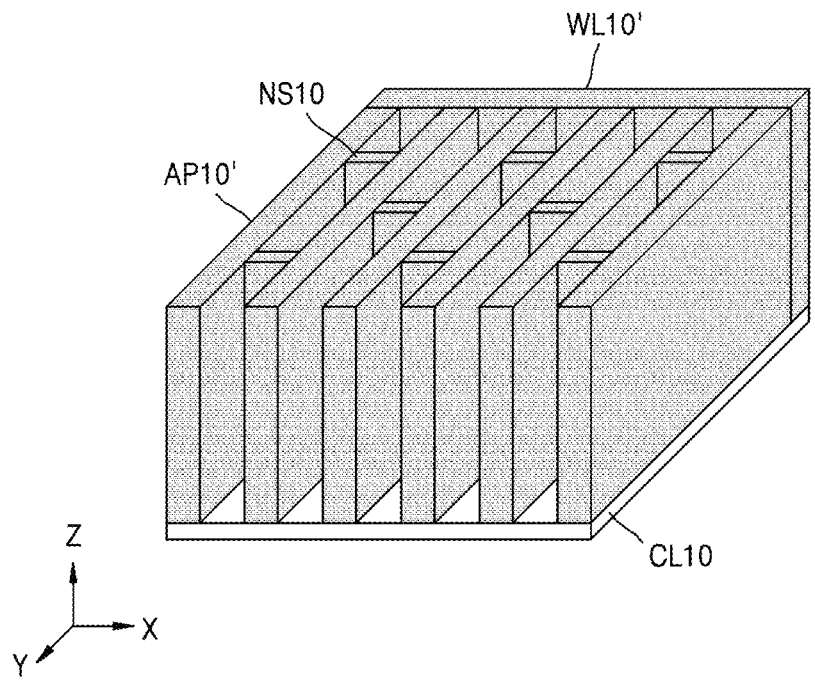
FIG. 10 is a perspective view of a 3D electrode structure according to another alternative embodiment.

In another alternative embodiment, the 3D electrode structure may have the same structure as the structure of FIG. 1, except that the inner current collector Cp10 is not used in the active material plates AP10, and the partition-wall current collecting layer Cw10 is not be used in the partition wall WL10, as illustrated in FIG. 10.

Referring to FIG. 10, an active material plate AP10' may not include an inner current collector, and a partition wall WL10' may not include an inner current collector, that is, a partition-wall current collecting layer. The active material plate AP10' may include a cathode active material. The material of the active material plate AP10' may be the same as or similar to those of the first and second plates parts AP10a and AP10b of FIG. 1. The partition wall WL10' may include a cathode active material. In such an embodiment, the active material of the partition wall WL10' may have the same composition as, or a different composition from, the active material of the active material plate AP10'.

Figure 11:
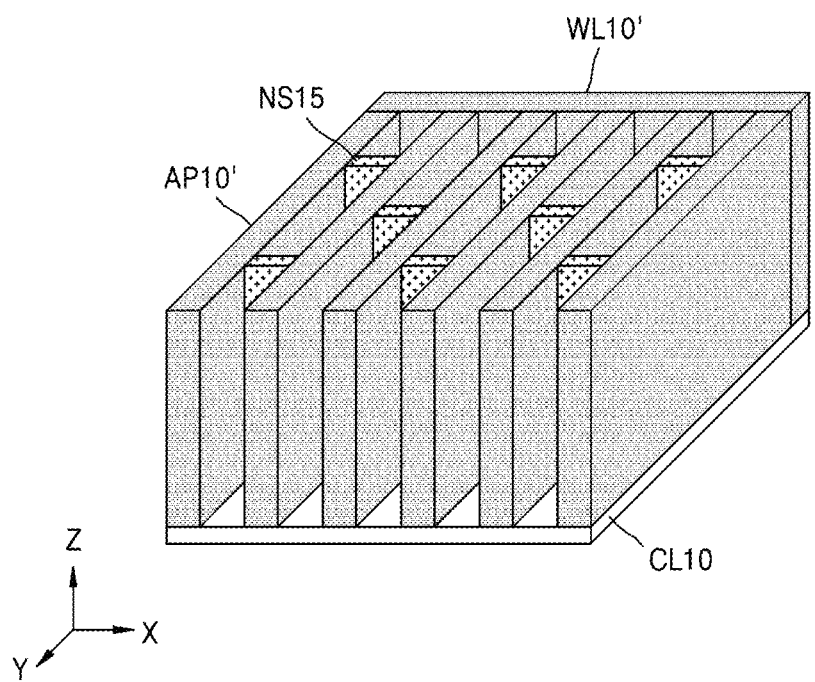
FIG. 11 is a perspective view of a 3D electrode structure according to another alternative embodiment.
Figure 12:
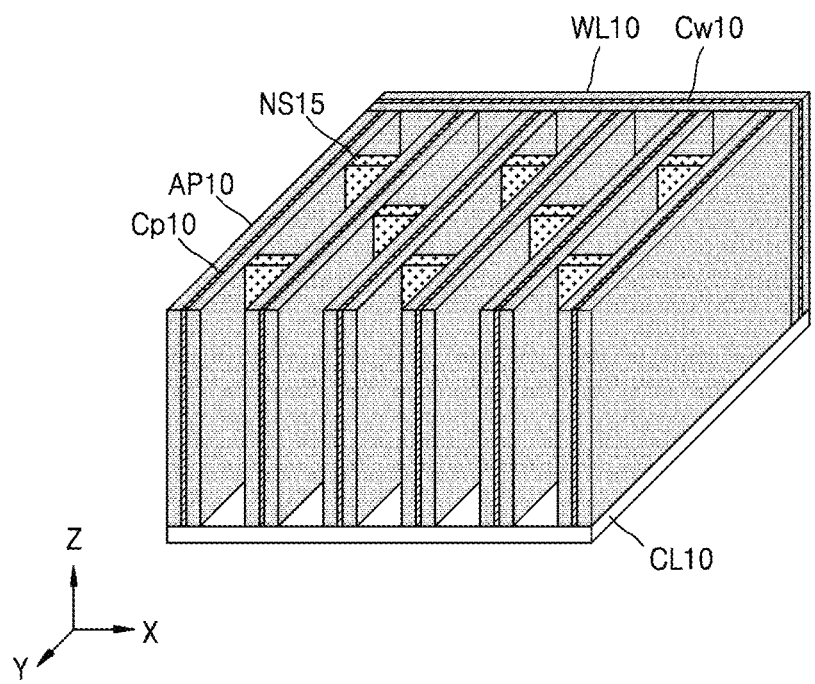
FIG. 12 is a perspective view of a 3D electrode structure according to another alternative embodiment.

In another alternative embodiment, the inner support layers NS10 may be formed of a non-active material, as illustrated in FIGS. 11 and 12.

FIG. 11 illustrates an embodiment where a non-active material inner support layer NS15 is applied to the structure of FIG. 10, and FIG. 12 illustrates an embodiment where the non-active material inner support layer NS15 is applied to the structure of FIG. 1. In the structure of FIG. 11, the other elements except for the inner support layer NS15 may be the same as that of the structure of FIG. 10, and in the structure of FIG. 12, the other element except for the inner support layer NS15 may be the same as those of the structure of FIG. 1. When the inner support layer NS15 formed of a non-active material is used, the kinds of materials applicable to the inner support layer NS15 may be various. Accordingly, an appropriate material may be applicable to the inner support layer NS15 considering enhancement of structural strength and ease of manufacture. In one embodiment, for example, a non-active material applicable to the inner support layer NS15 may include, for example, an Al oxide, a Zr oxide, a Si oxide, and a Li—Si oxide. In some embodiments having the structures of FIGS. 10 and 11, the partition wall WL10' may be formed of a non-active material.

Figure 13:
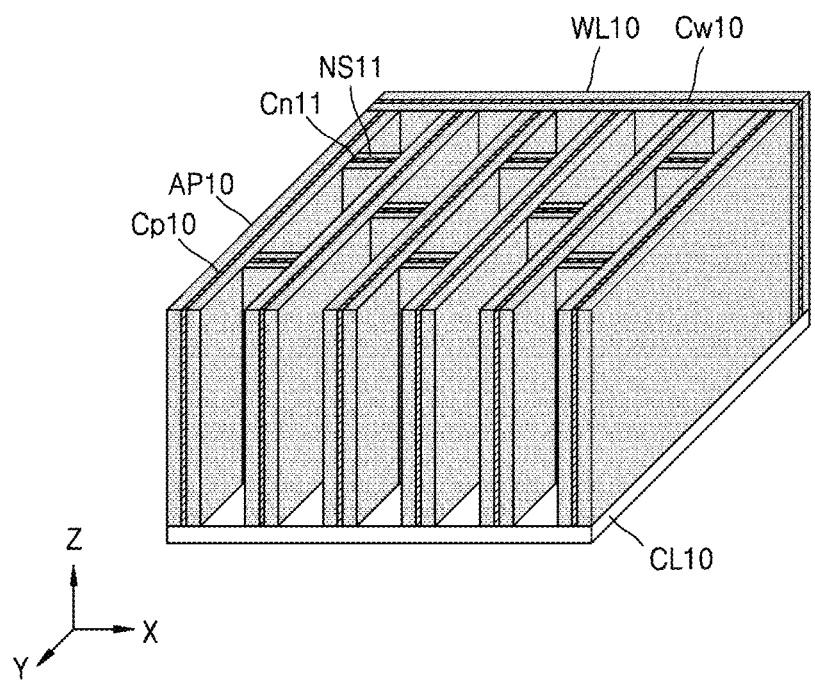
FIG. 13 is a perspective view of a 3D electrode structure according to another alternative embodiment.

In another alternative embodiment, an inner current collecting layer may be disposed in each of the inner support layers NS10, as illustrated in FIG. 13.

Referring to FIG. 13, an inner current collecting layer Cn11 (hereinafter, referred to as the support-layer current collecting layer) may be provided in each of inner support layers NS11. The support-layer current collecting layer Cn11 may electrically contact the current collecting layer CL10. The material of the support-layer current collecting layer Cn11 may be the same as or similar to that material of the inner current collector Cp10 or the partition-wall current collecting layer Cw10 of FIG. 1. In an embodiment, the support-layer current collecting layer Cn11 may include a conductive material. In one embodiment, for example, the support-layer current collecting layer Cn11 may include at least one of Cu, Au, Pt, Ag, Zn, Al, Mg, Ti, Fe, Co, Ni, Ge, In and Pd. Each of the inner support layers NS11 may be divided into first and second support layer parts by the support-layer current collecting layer Cn11. The first and second support layer parts may include a cathode active material. In such an embodiment, the active material of the first and second support layer parts may have a composition that is the same as or different from that of the active material of the active material plates AP10. In such an embodiment, where the support-layer current collecting layer Cn11 is used, current may be easily supplied to the entire inner support layers NS11 via the support-layer current collecting layer Cn11. In such an embodiment, charges or electrons generated from the inner support layers NS11 may be easily moved to the current collecting layer CL10 via the support-layer current collecting layer Cn11. Accordingly, performance of a second battery employing the 3D electrode structure may be further improved.

Figure 14:
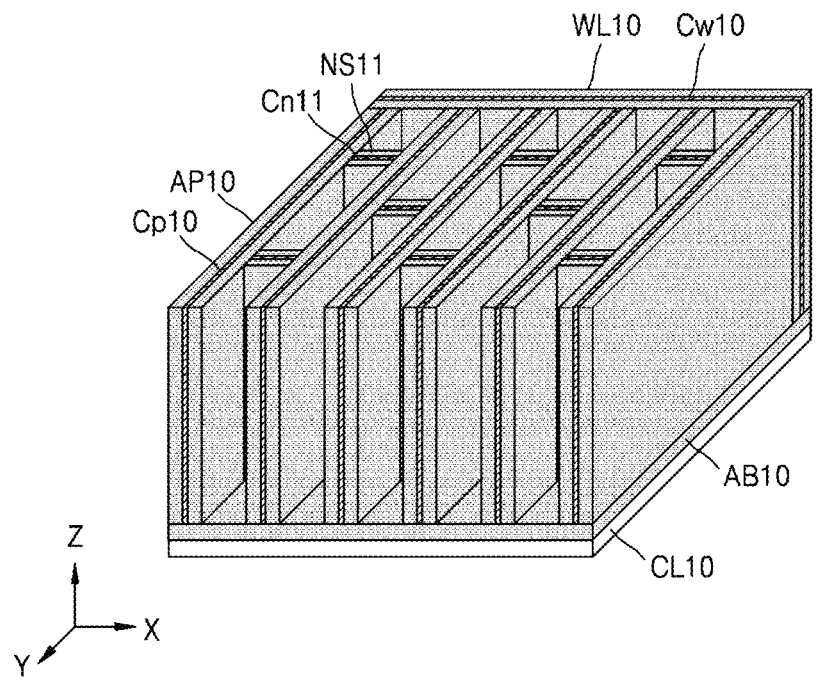
FIG. 14 is a perspective view of a 3D electrode structure according to another alternative embodiment.

In another alternative embodiment, a base layer including an active material (active material base layer) may be further disposed between the current collecting layer CL10 and the active material plates AP10 or AP10', as illustrated in FIG. 14.

FIG. 14 illustrates a case in which an active material base layer AB10 is applied to the structure of FIG. 13. The active material base layer AB10 may be provided on the current collecting layer CL10, and the active material plates AP10 may be provided on the active material base layer AB10. Accordingly, the active material plates AP10 may be electrically connected to the current collecting layer CL10 via the active material base layer AB10. When each of the active material plates AP10 includes the inner current collector Cp10, the inner current collector Cp10 may electrically contact the active material base layer AB10. Furthermore, the inner support layers NS11 and the partition wall WL10 may be provided on the active material base layer AB10. When the support-layer current collecting layer Cn11 and the partition-wall current collecting layer Cw10 are used, they may electrically contact the active material base layer AB10. The active material (cathode active material) of the active material base layer AB10 may have a composition that is the same as or different from the active material of the active material plates AP10.

The active material base layer AB10 may function to improve structural stability of the 3D electrode structure. When the active material base layer AB10 is used, no or insignificant difference is in the shrinkage rate between the active material base layer AB10 and the active material plates AP10 and thus it may be easy to secure structural stability.

Figure 15:
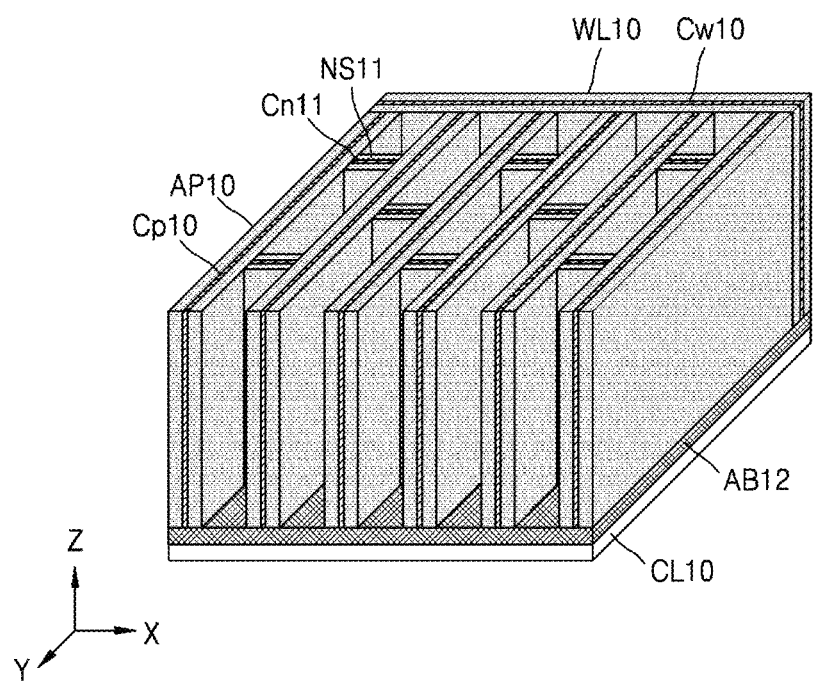
FIG. 15 is a perspective view of a 3D electrode structure according to another alternative embodiment.

In another alternative embodiment, a sintered composite of an active material and a metal may be applied as the material of the active material base layer AB10, as illustrated in FIG. 15.

Referring to FIG. 15, a sintered composite of an active material and a metal may be used as the material of an active material base layer AB12. Here, the sintered composite is referred to as the "active material-metal sintered composite". The active material may be a cathode active material. In one embodiment, for example, the cathode active material may include a Li-containing oxide. The Li-containing oxide may be an oxide including Li and a transition metal. The Li-containing oxide may be, for example, $LiMO_2$, where M denotes a metal. The M may be any one of Co, Ni and Mn, or a combination of two or more thereof. In one embodiment, for example, $LiMO_2$ may be $LiCoO_2$. The cathode active material may include ceramic of a cathode composition, and may be polycrystal or single crystal. However, the materials of the cathode active material described above are merely exemplary, and other cathode active materials may be used. The metal included in the active material base layer AB12, that is, the metal included in the active material-metal sintered composite, may include at least one selected from, for example, Al, Cu, Ni, Co, Cr, W, Mo, Ag, Au, Pt, and Pd. The content of the metal in the active material-metal sintered composite may be, for example, in a range of about 1 volume percent (vol %) to about 30 vol %. The active material-metal sintered composite may include a plurality of active material grains and a plurality of metal grains. An average size of the metal grains may be smaller than an average size of the active material grains. The metal grains may be at a grain boundary of the active material grains or in the vicinity thereof.

In an embodiment, where the active material base layer AB12 includes an active material-metal sintered composite, the active material base layer AB12 may have a high electrical conductivity. Accordingly, in such an embodiment, a large number of the active material plates AP10 may be formed on the active material base layer AB12, and the AR, that is, a ratio of height to thickness, of the active material plates AP10 may be further increased. In such an embodiment, since the active material base layer AB12 has a high electrical conductivity, the active material base layer AB12 may have a high current density. As the active material plates AP10 have a high AR and the active material base layer AB12 has a high current density, a secondary battery including the 3D electrode structure of such an embodiment may have enhanced energy density and improved rate capability. In such an embodiment, since the electrical conductivity of the active material base layer AB12 is high, it is easy to secure a thickness of the active material base layer AB12 to a certain level or more. Accordingly, the structural stability may be further secured.

Figure 16:
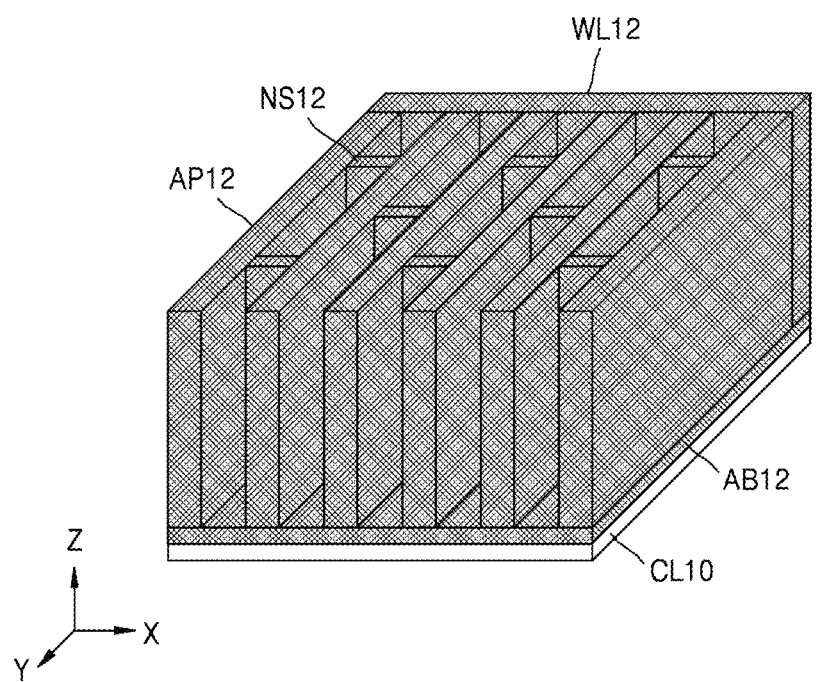
FIG. 16 is a perspective view of a 3D electrode structure according to another alternative embodiment.

In another alternative embodiment, the active material-metal sintered composite may be applied to at least one of the active material plates AP10 or AP10', the inner support layers NS10 or NS11, and the partition wall WL10, as illustrated in FIG. 16.

Referring to FIG. 16, in an embodiment, the active material base layer AB12 may be disposed on the current collecting layer CL10. The active material base layer AB12 may include the active material-metal sintered composite as described in FIG. 15. A plurality of active material plates AP12 and a plurality of inner support layers NS12 supporting the active material plates AP12 between the active material plates AP12 may be disposed on the active material base layer AB12. In such an embodiment, a plurality of partition walls WL12 supporting the active material plates AP12 outside the active material plates AP12 may be further disposed on the active material base layer AB12.

The active material plates AP12 may include a sintered composite of an active material and a metal. As described above, the sintered composite is referred to as the "active material-metal sintered composite". The active material may be a cathode active material. In one embodiment, for example, the cathode active material may include a Li-containing oxide. The Li-containing oxide may be, for example, $LiMO_2$, where M denotes the metal. The M may be any one of Co, Ni and Mn, or a combination of two or more thereof. The cathode active material may include ceramic of a cathode composition, and may be polycrystal or single crystal. However, the materials of the cathode active material described above are merely exemplary, and other cathode active materials may be used. The metal included in the active material plates AP12, that is, the metal included in the active material-metal sintered composite, may include at least one selected from, for example, Al, Cu, Ni, Co, Cr, W, Mo, Ag, Au, Pt, and Pd. The content of metal in the active material-metal sintered composite of the active material plates AP12 may be, for example, in a range of about 1 vol % to about 20 vol %. The active material-metal sintered composite may include a plurality of active material grains and a plurality of metal grains. An average size of the metal grains may be smaller than an average size of the active material grains. The metal grains may be at a grain boundary of the active material grains or in the vicinity thereof.

In such an embodiment, where each of the active material plates AP12 includes the active material-metal sintered composite and the active material base layer AB12 includes the active material-metal sintered composite, the metal content (vol %) of the active material-metal sintered composite of the active material plates AP12 may be less than the metal content (vol %) of the active material-metal sintered composite of the active material base layer AB12. Accordingly, the volume fraction of the metal in the active material plates AP12 may be less than the volume fraction of the metal in the active material base layer AB12. In such an embodiment, the volume fraction of the active material in the active material plates AP12 may be greater than the volume fraction of the active material the active material base layer AB12. The active material plates AP12 may have high electrical conductivity properties and may improve energy density. The electrical conductive properties may be improved by the metal included in the active material plates AP12, and the energy density may be improved because the active material volume fraction of the active material plates AP12 is relatively large. The electrical conductivity of the active material-metal sintered composite of the active material base layer AB12 may be higher than the electrical conductivity of the active material-metal sintered composite of the active material plates AP12. By using the active material base layer AB12, high electrical conductivity properties may be obtained with respect to the active material plates AP12, and the height of the active material plates AP12 may be easily increased. Accordingly, in such an embodiment, energy density may be enhanced and rate capability may be improved. In such an embodiment, since the thickness of the active material base layer AB12 may be increased such that structural stability may be secured. In an embodiment, the metal content of the active material plates AP12 may be less than the metal content of the active material base layer AB12, and the electrical conductivity of the active material base layer AB12 may be higher than the electrical conductivity of the active material plates AP12, but not being limited thereto. In an alternative embodiment, the metal content of the active material plates AP12 may be the same as or similar to the metal content of the active material base layer AB12, or the electrical conductivity of the active material base layer AB12 may be the same as or similar to the electrical conductivity of the active material plates AP12.

The inner support layers NS12 and the partition walls WL12 may include or be formed of a material that is the same as or similar to the material of the active material plates AP12. Accordingly, the inner support layers NS12 and the partition walls WL12 may include the active material-metal sintered composite. The active material-metal sintered composites of the inner support layers NS12 and the partition walls WL12 may be the same as or similar to the above-described active material-metal sintered composite of the active material plates AP12. Accordingly, the metal content (vol %) of the active material-metal sintered composites of the inner support layers NS12 and the partition walls WL12 may be less than the metal content (vol %) of the active material-metal sintered composite of the active material base layer AB12. In such an embodiment, the electrical conductivity of the active material-metal sintered composite of the active material base layer AB12 may be higher than the electrical conductivity of the active material-metal sintered composites of the inner support layers NS12 and the partition walls WL12. The inner support layers NS12 and the partition walls WL12 may contribute to the battery reaction, for example, cathode reaction, similar to the active material plates AP12, while supporting the active material plates AP12.

Although the active material base layer AB12 is called "active material base layer" because the active material base layer AB12 includes an active material, the active material base layer AB12 may include or formed of another material in addition to the active material. In an embodiment, the active material base layer AB12 may further include another material, for example, a metal. This may be identically applied to the active material plates AP12.

Figure 17:
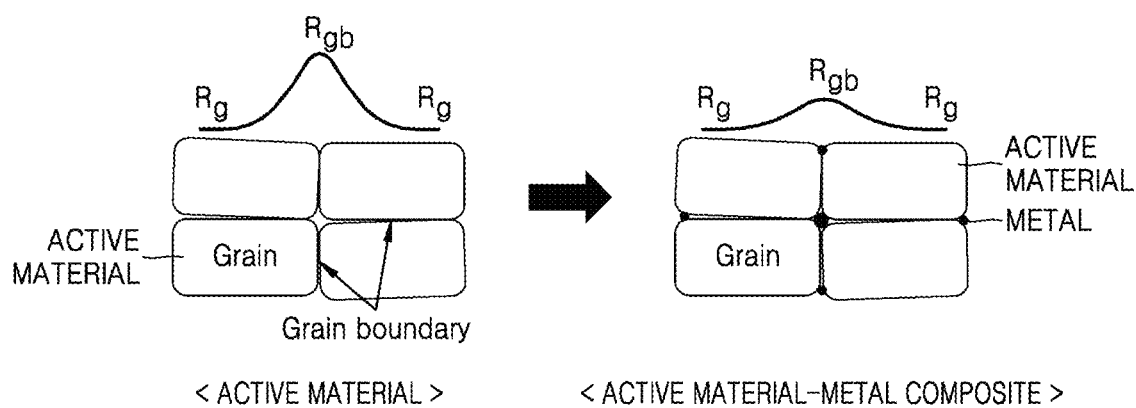
FIG. 17 illustrates structures and properties of an active material sintered body and an active material-metal sintered composite.

FIG. 17 illustrates the structures and properties of an active material sintered body and an active material-metal sintered composite, in which the active material sintered body is illustrated in the left side and the active material-metal sintered composite is illustrated in the right side.

Referring to the left figure of FIG. 17, the active material sintered body may include or be formed of a plurality of active material grains, and a grain boundary may be defined between the active material grains. Each of the active material grains may be a ceramic sintered body of a cathode composition. Since resistance Rgb is high at the grain boundary, electrical conductivity may be low. The resistance Rgb of the grain boundary may be higher than resistance Rg of the active material grain. Thus, overall resistance of the active material sintered body may be increased.

However, as illustrated in the right figure of FIG. 17, when the active material-metal sintered composite is formed, the resistance Rgb of the grain boundary may be lowered by the metal and electrical conductivity may be increased. As a result, the electrical conductivity of the active material-metal sintered composite may be substantially higher than the electrical conductivity of the active material sintered body.

Although FIG. 17 shows that a plurality of metal grains are formed on or around the grain boundary of the active material grains, and the metal grains have a relatively circular (spherical) particle shape, this is merely exemplary, and the shapes or sizes of the active material grain and the metal grains may be changed. In one alternative embodiment, for example, the metal grain may be deformed from a particle shape to fill a considerable portion of a grain boundary area between the active material grains, as illustrated in FIG. 18.

Figure 18:
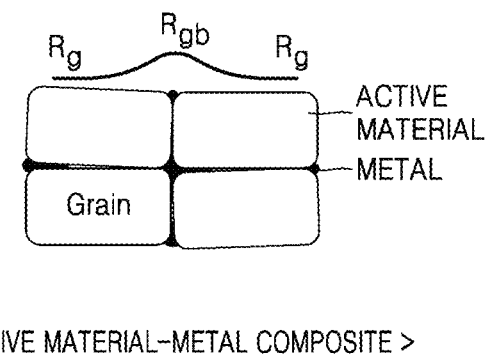
FIG. 18 illustrates a structure and properties of an active material-metal sintered composite according to another embodiment.

FIG. 18 illustrates the structure and properties of an active material-metal sintered composite according to an alternative embodiment.

Referring to FIG. 18, may include a plurality of active material grains and a plurality of metal grains, and the metal grains fill a considerable portion of a grain boundary area between the active material grains in the active material-metal sintered composite. In such an embodiment, the resistance Rgb at the grain boundary may be further lowered. Accordingly, the electrical conductivity of the active material-metal sintered composite may be further increased. A fine structure of the active material-metal sintered composite may be changed in various ways according to the type of metal, the type of active material, and a sintering condition.

A secondary battery having high performance may be implemented by employing the 3D electrode structures according to the embodiments described above. Hereinafter, embodiments of the secondary battery including the 3D electrode structure will be described in detail.

Figure 19:
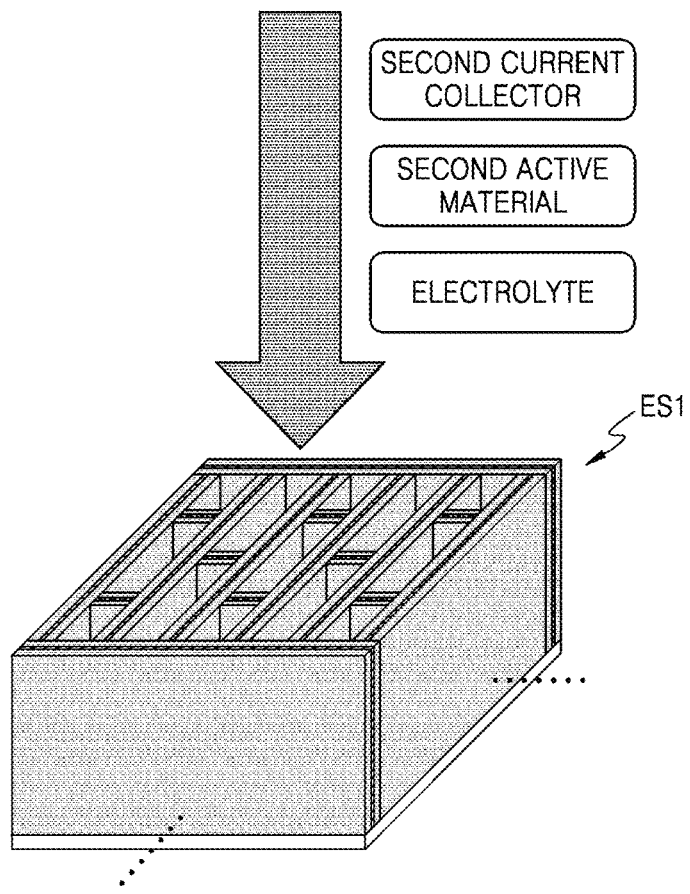
FIG. 19 illustrates a method of manufacturing a secondary battery including a 3D electrode structure according to an embodiment.

FIG. 19 illustrates a method of manufacturing a secondary battery including a 3D electrode structure according to an embodiment.

Referring to FIG. 19, a secondary battery may be manufactured by sequentially providing, e.g., forming, an electrolyte layer, a second active material and a second current collecting layer in a 3D electrode structure ES1. The 3D electrode structure ES1 may have a structure corresponding to the electrode structures described above with reference to FIGS. 1 and 6 to 18 or a modification thereof.

Figure 20:
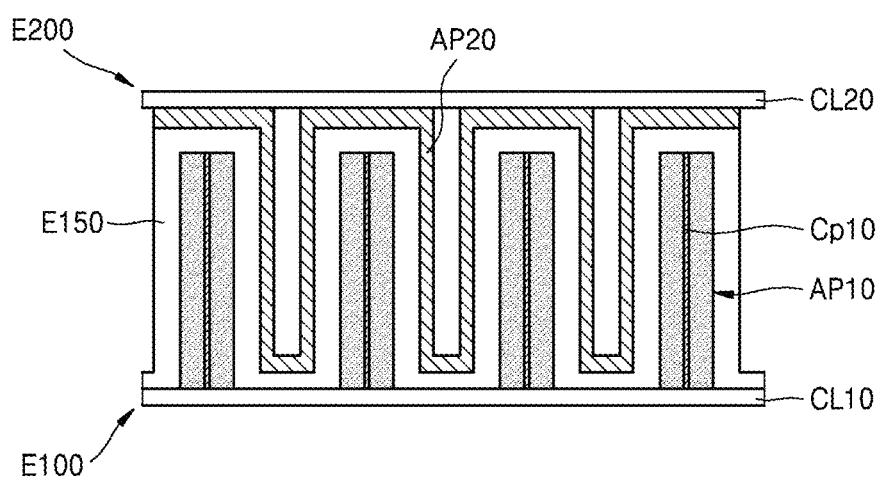
FIG. 20 is a cross-sectional view of a secondary battery including a 3D electrode structure, according to an embodiment.

FIG. 20 is a cross-sectional view of a secondary battery including a 3D electrode structure according to an embodiment.

Referring to FIG. 20, an embodiment of the secondary battery includes a first electrode structure E100, and a second electrode structure E200 spaced apart from the first electrode structure E100. The secondary battery further includes an electrolyte layer E150 disposed between the first electrode structure E100 and the second electrode structure E200.

The first electrode structure E100 may correspond to one of the embodiments of the 3D electrode structure described above with reference to FIGS. 1 and 6 to 18. In one embodiment, for example, the first electrode structure E100 may include a first current collecting layer CL10, a plurality of first active material plates AP10, and a plurality of inner support layers (not shown). A first inner current collector Cp10 may be disposed in each of the first active material plates AP10. The first current collecting layer CL10, the first active material plates AP10 and the first inner current collector Cp10 may correspond to the current collecting layer CL10, the active material plates AP10 and the inner current collector Cp10 of FIG. 1, respectively. The first electrode structure E100 may be a cathode structure. In such an embodiment, the first current collecting layer CL10 and the first active material plates AP10 may be a cathode current collecting layer and cathode active material plates, respectively.

The electrolyte layer E150 covering the first active material plates AP10 may be disposed on the first current collecting layer CL10. The electrolyte layer E150 may have a winding (meandering) shape corresponding to the shape of the first active material plates AP10. The electrolyte layer E150 may include a solid electrolyte. In one embodiment, for example, the electrolyte layer E150 may include a solid electrolyte such as $Li_3PO_4$, $Li_3PO_{4-x}N_x$, $LiBO_{2-x}N_x$, $Li_3PO_4N_x$, $LiBO_2N_x$, $Li_4SiO_4$—$Li_3PO_4$, or $Li_4SiO_4$—$Li_3VO_4$. In such an embodiment, the electrolyte layer E150 may include a polymer electrolyte. In such an embodiment, the material and shape of the electrolyte layer E150 may be changed in various ways.

The second electrode structure E200 may include a second current collecting layer CL20. The second current collecting layer CL20 may be arranged facing the first current collecting layer CL10. The second electrode structure E200 may include a second active material member AP20 electrically connected to the second current collecting layer CL20. The second active material member AP20 may have a structure of electrically contacting the second current collecting layer CL20 and extending between the first active material plates AP10. In the second active material member AP20, a portion extending between the first active material plates AP10 may have a plate shape. Accordingly, the portion of the second active material member AP20 extending between the first active material plates AP10 may be referred to as "a plurality of second active material plates". In such an embodiment, the first active material plates AP10 and the second active material plates may be alternately arranged. The electrolyte layer E150 may be disposed between the first active material plates AP10 and the second active material member AP20. The second electrode structure E200 may be an anode structure. In such an embodiment, the second current collecting layer CL20 may be an anode current collecting layer, and the second active material member AP20 may include an anode active material. The anode active material may include, for example, Li metal, a carbon-based material, a silicon-based material, or an oxide. The anode current collecting layer may include at least one of conductive materials, for example, Cu, Au, Pt, Ag, Zn, Al, Mg, Ti, Fe, Co, Ni, Ge, In, and Pd. However, the materials of the anode active material and the anode current collecting layer described above are merely exemplary, and may be changed. FIG. 20 shows an embodiment including four first active material plates AP10, but this is merely exemplary, and the number of the first active material plates AP10 may be changed.

Figure 21:
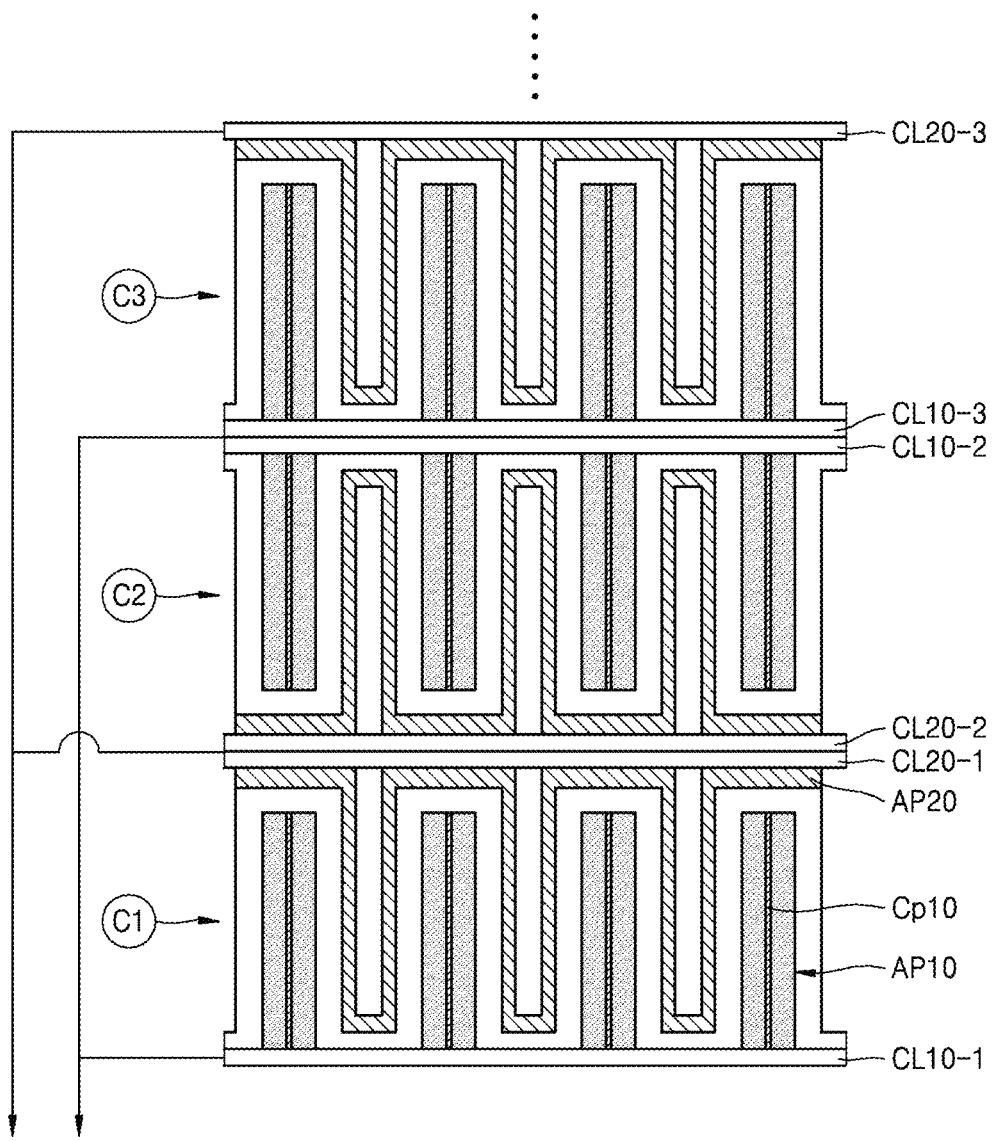
FIG. 21 is a cross-sectional view of a stacked secondary battery including a 3D electrode structure, according to an embodiment.

The structure of the secondary battery described with reference to FIG. 20 may be a single battery cell or a unit cell, and a stacked secondary battery may be formed by stacking a plurality of battery cells, as illustrated in FIG. 21.

FIG. 21 is a cross-sectional view of a stacked secondary battery including a 3D electrode structure, according to an embodiment.

Referring to FIG. 21, a stacked secondary battery may include a stack of a plurality of battery cells, e.g., a first battery cell C1, a second batter cell C2 and a third battery cell C3, each of which correspond to the battery cell described with reference to FIG. 20. Although FIG. 21 shows that the battery cells include the first battery cell C1, the second battery cell C2 and the third battery cell C3, the number of battery cells may be changed. The first battery cell C1 may have a same structure as the structure illustrated in FIG. 20. The second battery cell C2 may have a structure that is the same as the structure of FIG. 20, but is upside down, that is, an inverted structure. The third battery cell C3 may have a same structure as the structure of FIG. 20. Accordingly, the battery cells C1, C2 and C3 may be stacked on one another in a way such that current collectors of a same polarity contact or face each other. In an embodiment, where a cathode current collecting layer and an anode current collecting layer of the first battery cell C1 are respectively a first cathode current collecting layer CL10-1 and a first anode current collecting layer CL20-1, and a cathode current collecting layer and an anode current collecting layer of the second battery cell C2 are respectively a second cathode current collecting layer CL10-2 and a second anode current collecting layer CL20-2, the first anode current collecting layer CL20-1 and the second anode current collecting layer CL20-2 may be arranged to contact or face each other. In an embodiment, where a cathode current collecting layer and an anode current collecting layer of the third battery cell C3 are respectively a third cathode current collecting layer CL10-3 and a third anode current collecting layer CL20-3, the second cathode current collecting layer CL10-2 and the third cathode current collecting layer CL10-3 may be arranged to contact or face each other. Accordingly, the odd-numbered battery cells C1 and C3 and the even-numbered battery cell C2 may have inverted structures with respect to each other. The cathode current collecting layers CL10-1, CL10-2, and CL10-3 may be electrically connected to one another, and the anode current collecting layers CL20-1, CL20-2, and CL20-3 may be electrically connected to one another. In an embodiment, the two current collecting layers contacting each other, for example, CL20-1 and CL20-2, may be integrally formed as a single unitary layer. In such an embodiment, where a stacked secondary battery is formed by stacking the battery cells C1, C2 and C3, a battery capacity per unit area may be substantially increased.

In an embodiment, as shown in FIG. 21, a plurality of battery cells may be stacked by changing directions (vertical direction), but not being limited thereto. In an alternative embodiment, the battery cells may be stacked without changing directions (vertical direction). In such an embodiment, a plurality of battery cells having the structures and direction equivalent to those of the battery cells of FIG. 20 may be stacked in one direction. In such an embodiment, an insulating layer may be provided between two neighboring battery cells to effectively prevent current collecting layers of opposite polarities from contacting each other.

Although in the structures of FIGS. 20 and 21 the first electrode structure E100 has the 3D electrode structure of FIG. 1, the first electrode structure E100 may be variously modified as described above with reference to FIGS. 6 to 18. Furthermore, the structures of the second electrode structure E200 illustrated and described in FIGS. 20 and 21 are merely exemplary, and may be modified in various ways. A modified structure of the second electrode structure E200 will hereinafter be described with reference to FIGS. 22 and 23.

Figure 22:
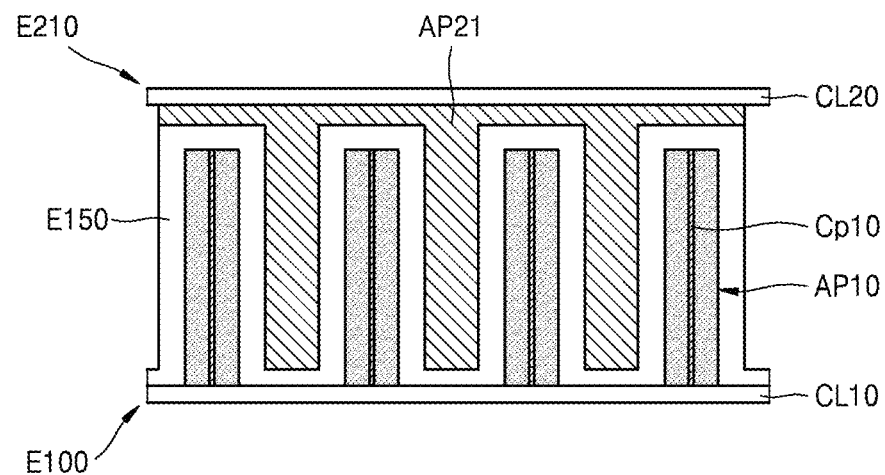
FIG. 22 is a cross-sectional view of a secondary battery including a 3D electrode structure according to an alternative embodiment.

In an alternative embodiment, as shown in FIG. 22, a second electrode structure E210 may include a second current collecting layer CL20 and a second active material member AP21 electrically connected to the second current collecting layer CL20. The second active material member AP21 may include a portion contacting the second current collecting layer CL20 and having a flat plate shape, and portions extending from the portion and having a plate shape filling a space between the first active material plates AP10. In the structure, as shown in FIG. 20, the second active material member AP20 partially, not fully, fills the space between the first active material plates AP10. Alternatively, in the structure, as shown in FIG. 22, the second active material member AP21 may fully, or mostly, fill the space between the first active material plates AP10.

Figure 23:
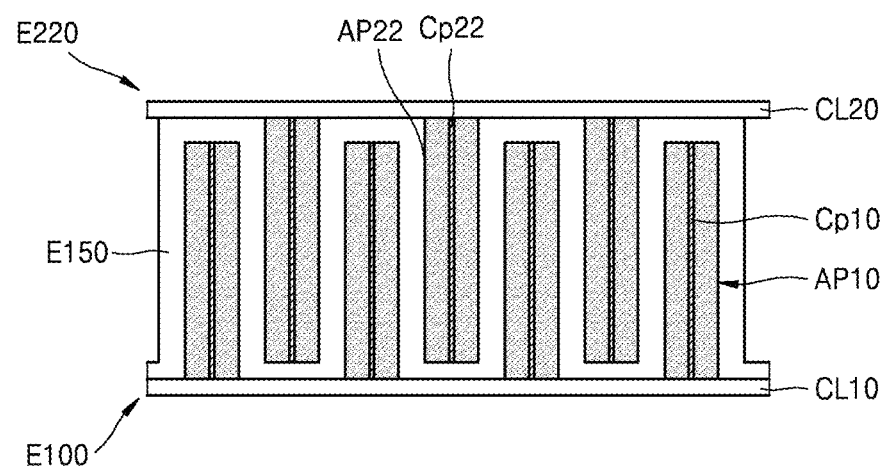
FIG. 23 is a cross-sectional view of a secondary battery including a 3D electrode structure according to another alternative embodiment.

In another alternative embodiment, as shown in FIG. 23, a second electrode structure E220 may include a second current collecting layer CL20 and a plurality of second active material plates AP22 electrically connected to the second current collecting layer CL20. The second active material plates AP22 may be "anode active material plates". Each of the second active material plates AP22 may further include a second inner current collector Cp22. The second inner current collector Cp22 may electrically contact the second current collecting layer CL20. The second inner current collector Cp22 may include or be formed of a conductor such as a metal. Although not illustrated, in some embodiments, a second base layer may be further disposed between the second current collecting layer CL20 and the second active material plates AP22. The second base layer may include a second active material, for example, an anode active material, and may further include another material.

The other structures of FIGS. 22 and 23, except for the second electrode structures E210 and E220, may be the same as or similar to those shown in FIG. 20.

In some embodiments, the second active material members AP20 and AP21 and the second current collecting layer CL20 in FIGS. 20 and 22 may be integrally formed as a single unitary unit. In such an embodiment, parts of the second active material members AP20 and AP21 may define a current collector. In such an embodiment, the second current collecting layer CL20 may not be separately formed.

Figure 24:
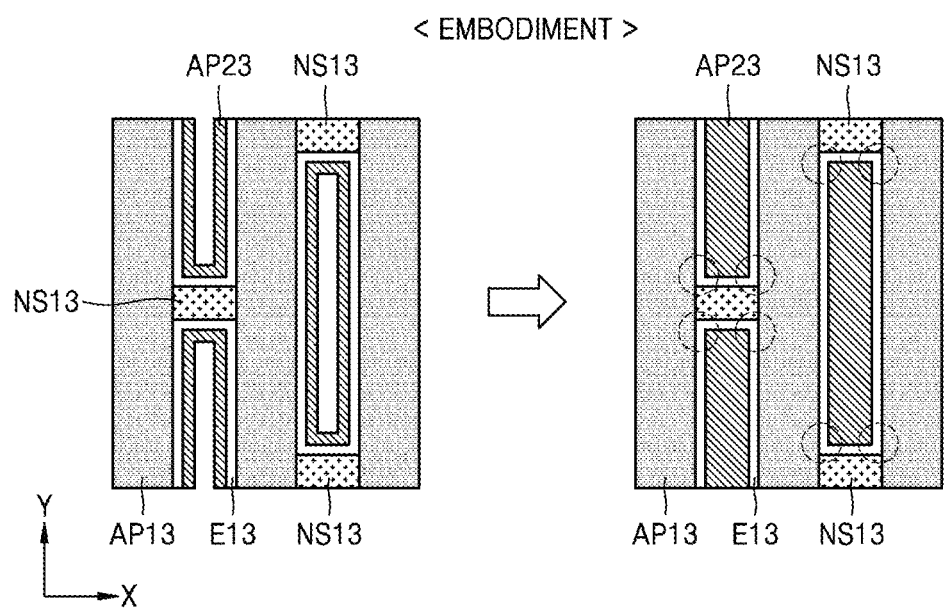
FIG. 24 is a plan view for explaining the effect of stress that may be generated in an electrode structure during the operation of a secondary battery including a 3D electrode structure according to an embodiment.

FIG. 24 is a plan view for explaining the effect of stress that may be generated in an electrode structure during the operation of a secondary battery including a 3D electrode structure according to an embodiment.

Referring to FIG. 24, a left figure shows an initial stage of charge and a right figure shows a final stage of charge. Referring to the left figure of FIG. 24, a plurality of first active material plates AP13 may be provided in an electrode structure and a plurality of inner support layers NS13 may be provided between the first active material plates AP13. In an electrode structure, an electrolyte layer E13 and a plurality of second active material members AP23 may be provided. The electrolyte layer E13 may be provided between the first active material plates AP13 and the second active material members AP23. The inner support layers NS13 may be arranged as shown in FIGS. 7 and 8. At the final stage of charge, as illustrated in the right figure of FIG. 24, the volume of the second active material members AP23 may increase so that stress may be generated. In the right figure of FIG. 24, a stress generation area is indicated by a dotted circle. In an embodiment, since the stress generation areas are arranged spaced apart from each other in the Y-axis direction, not continuously arranged in the X-axis direction, an effect of reducing the stress may be obtained. Accordingly, irregular reaction and lifespan reduction due to the stress may be reduced or effectively prevented.

Figure 25:
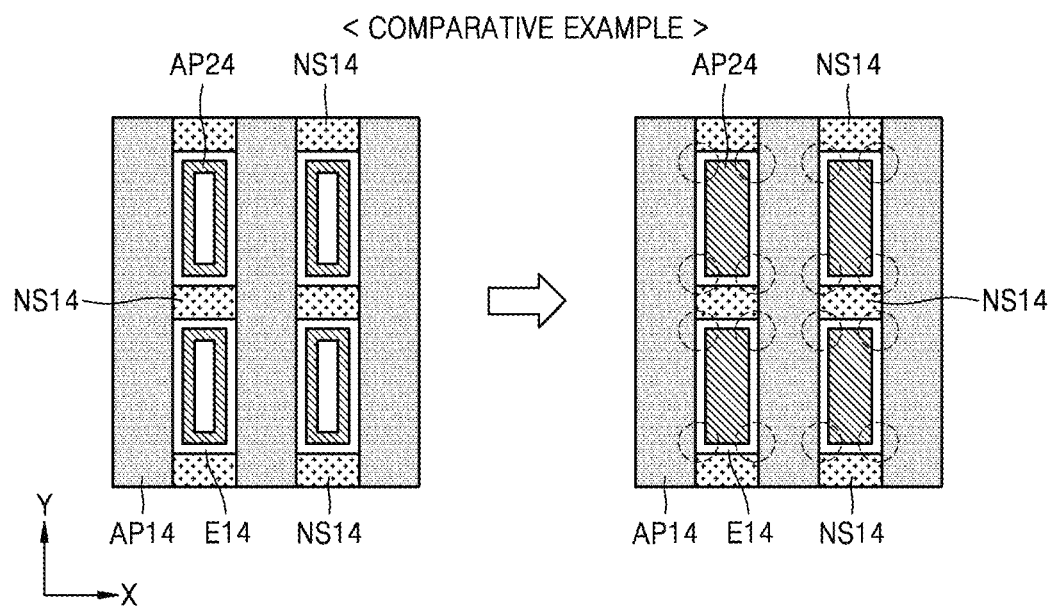
FIG. 25 is a plan view for explaining the effect of stress that may be generated in an electrode structure during the operation of a secondary battery including a 3D electrode structure according to a comparative example.

FIG. 25 is a plan view for explaining the effect of stress that may be generated in an electrode structure during the operation of a secondary battery including a 3D electrode structure according to a comparative example.

Referring to FIG. 25, a left figure shows an initial stage of charge and a right figure shows a final stage of charge. A plurality of first active material plates AP14, a plurality of inner support layers NS14, an electrolyte layer E14, and a plurality of second active material members AP24 are provided in an electrode structure. The inner support layers NS14 are arranged to overlap each other in the X-axis direction, unlike the structure shown in FIGS. 7 and 8. At the final stage of charge, as illustrated in the right figure of FIG. 25, as the volume of the second active material members AP24 increase, stress may be generated. In the structure, since stress generation areas indicated by a dotted circle are arranged adjacently in the X-axis direction, stress is not reduced and problems due to the stress may be generated. In one embodiment, for example, structural defects (cracks), reaction irregularity, and lifespan reduction may be generated.

FIGS. 26A to 26M illustrate a method of manufacturing a 3D electrode structure according to an embodiment. FIG. 27A is an enlarged view of the encircled portion of FIG. 26G, FIG. 27B is an enlarged view of the encircled portion of FIG. 26H, FIG. 27C is an enlarged view of the encircled portion of FIG. 26I, FIG. 27D is an enlarged view of the encircled portion A of FIG. 26L, FIG. 27E is an enlarged view of the encircled portion B of FIG. 26L, FIG. 27F is an enlarged view of the encircled portion A of FIG. 26M, and FIG. 27G is an enlarged view of the encircled portion B of FIG. 26M.

Figure 26A:
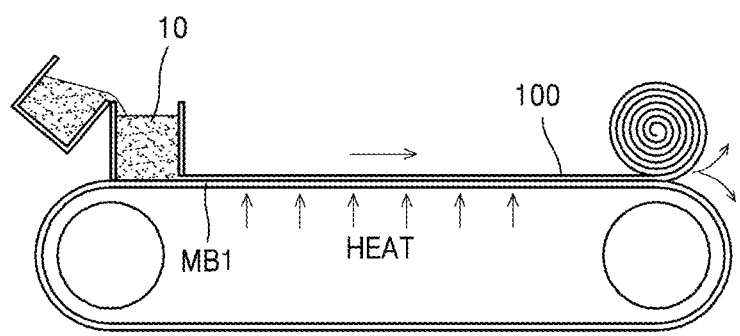
FIGS. 26A to 26M are drawings for explaining a method of manufacturing a 3D electrode structure according to an embodiment.
Figure 27A:
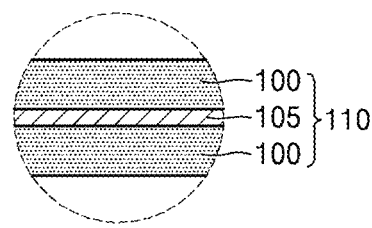
FIG. 27A is an enlarged view of the encircled portion of FIG. 26G.
Figure 27B:
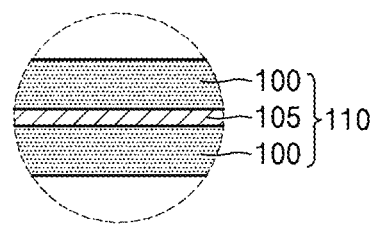
FIG. 27B is an enlarged view of the encircled portion of FIG. 26H.
Figure 27C:
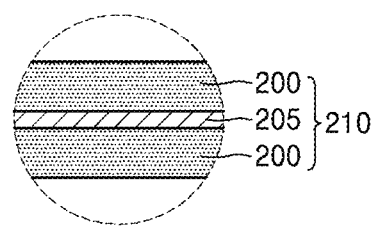
FIG. 27C is an enlarged view of the encircled portion of FIG. 26I.
Figure 27D:
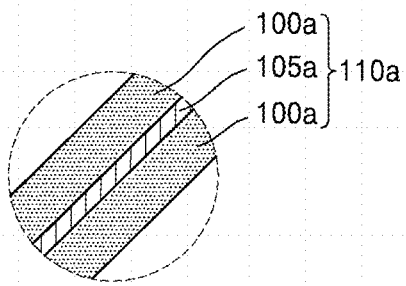
FIG. 27D is an enlarged view of the encircled portion A of FIG. 26L.
Figure 27E:
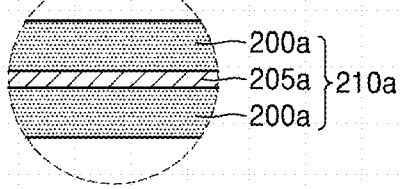
FIG. 27E is an enlarged view of the encircled portion B of FIG. 26L.
Figure 27F:
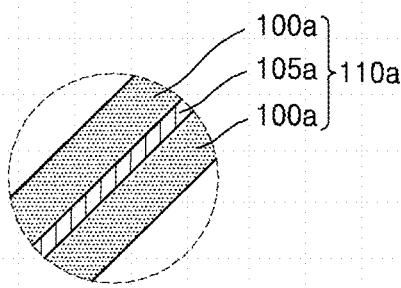
FIG. 27F is an enlarged view of the encircled portion A of FIG. 26M.
Figure 27G:
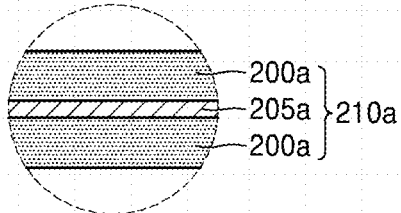
FIG. 27G is an enlarged view of the encircled portion B of FIG. 26M.

Referring to FIG. 26A, after an active material slurry 10 is prepared, an active material sheet 100 may be formed from the active material slurry 10. In one embodiment, for example, the active material sheet 100 may be formed from the active material slurry 10 by using a tape-casting method.

The active material slurry 10 may be manufactured by mixing, for example, an active material ingredient (powder), a binder, a dispersing agent, and a plasticizer with a solvent. In an embodiment, a grinder or a mixing apparatus such as a ball mill may be used for the mixing. The active material ingredient may be a cathode active material, and the cathode active material may include a Li-containing oxide. The Li-containing oxide may be an oxide including Li and a transition metal. The Li-containing oxide may be, for example, $LiMO_2$, where M denotes metal. The M may be any one of Co, Ni and Mn, or a combination of two or more thereof. In an example, the $LiMO_2$ may be $LiCoO_2$. However, the material of the cathode active material described above is merely exemplary, and other cathode active materials may be used therefor.

The active material slurry 10 may be processed in a sheet shape by using a shaping apparatus such as a tape-casting apparatus. In an embodiment, the active material slurry 10 may be coated on a moving belt MB1 to a uniform thickness by using a doctor blade (not shown). As the active material slurry 10 coated on the moving belt MB1 is dried, that is, the solvent is evaporated, the active material sheet 100 may be formed.

Figure 26B:
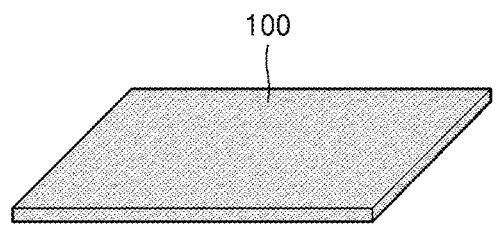

FIG. 26B illustrates the active material sheet 100 formed by the method described above with reference to FIG. 26A. The active material sheet 100 may have a thickness of, for example, in a range of about 1 μm to about 100 μm, but the disclosure is not limited thereto.

Figure 26C:
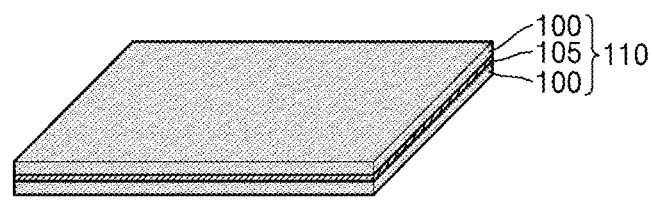

Referring to FIG. 26C, an inner current collecting layer 105 may be formed by coating or printing inner current collector paste or slurry on a surface of the active material sheet 100. The inner current collecting layer 105 may be deposited by a physical vapor deposition ("PVD") method such as a sputtering or evaporation method. Next, another active material sheet 100 may be separately stacked on the inner current collecting layer 105. The two active material sheets 100 and the inner current collecting layer 105 provided between the two active material sheets 100 may form a single unit structure 110.

Figure 26D:
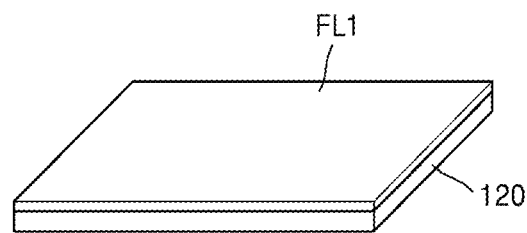

By using a method similar to the method described above with reference to FIGS. 26A and 26B, a sacrificial layer sheet 120 illustrated in FIG. 26D may be formed from a sacrificial layer slurry. The sacrificial layer slurry may be manufactured by mixing a sacrificial layer material, a binder, a dispersing agent, and a plasticizer with a solvent. The sacrificial layer material may be, for example, a carbon-based material such as graphite. Alternatively, Li-containing oxide, Li-containing carbonate, or Li-containing chloride may be used as the sacrificial layer material. The Li-containing oxide may include, for example, $Li_2CoSiO_4$, the Li-containing carbonate may include, for example, $Li_2CO_3$, and the Li-containing chloride may include, for example, LiCl. However, the sacrificial layer material is not limited to those described above, and other various materials may be used therefor.

Although the sacrificial layer sheet 120 of FIG. 26D may have a thickness of, for example, in a range of about 1 μm to about 100 μm, but the disclosure is not limited thereto. In an embodiment, a carrier film FL1 may be provided on a surface of the sacrificial layer sheet 120. The carrier film FL1 may be attached on the surface of the sacrificial layer sheet 120 in the tape-casting process of FIG. 26A.

Figure 26E:
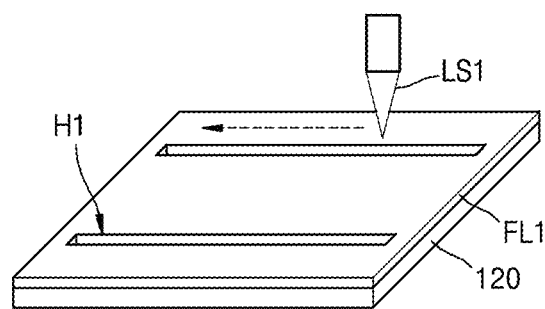

Referring to FIG. 26E, at least one via hole H1 may be formed in the sacrificial layer sheet 120 by using a predetermined method. In one embodiment, for example, at least one via hole H1 may be formed in the carrier film FL1 and the sacrificial layer sheet 120 thereunder through a drilling process using a laser LS1, that is, a laser drilling process. The via hole H1 may have a line shape. In one embodiment, for example, the via hole H1 may be a hole having a line shape having a width in a range of about 5 μm to about 100 μm, or in a range of about 5 μm to about 50 μm. The via hole H1 may be formed in the other area of the sacrificial layer sheet 120, except for both end portions of the sacrificial layer sheet 120 in the length direction of the via hole H1.

Then, after the via hole H1 is filled with an inner layer material (130 of FIG. 26F), the carrier film FL1 may be removed. A resultant thereof is illustrated in FIG. 26F.

Figure 26F:
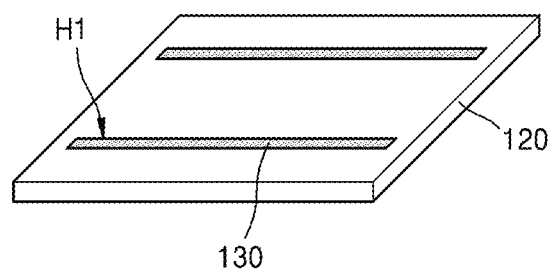
Figure 26G:
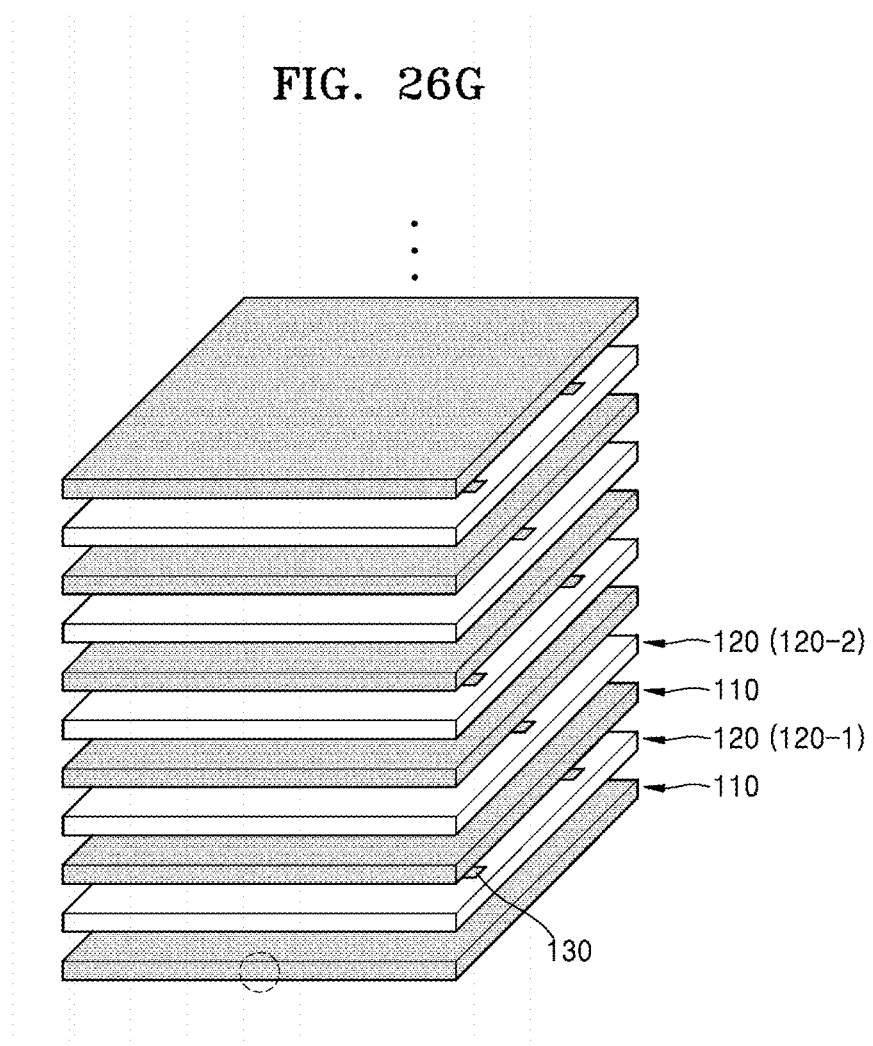
Figure 26H:
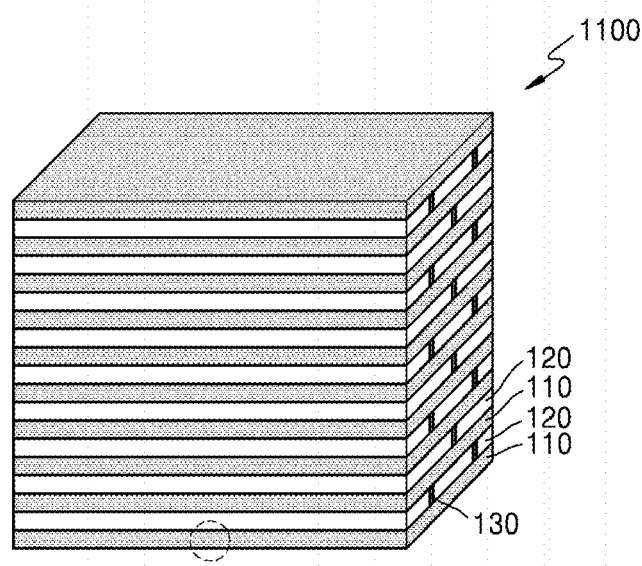
Figure 26I:
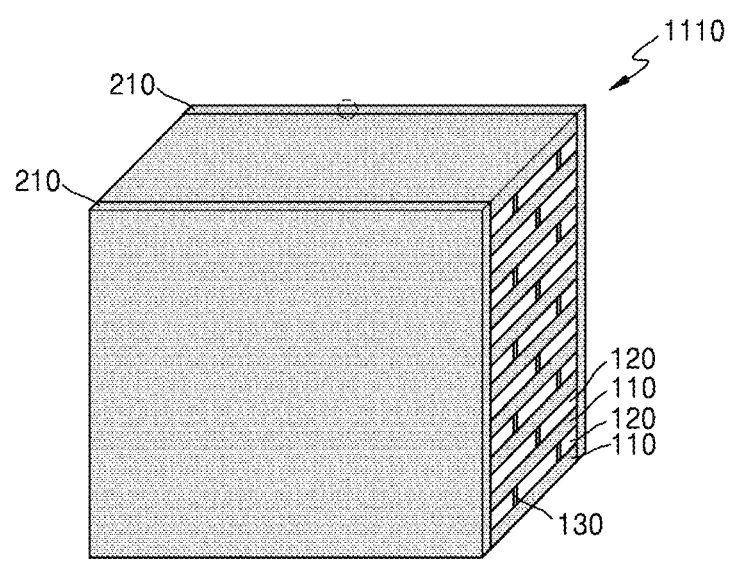

Referring to FIG. 26F, the via hole H1 of the sacrificial layer sheet 120 may be filled with the inner layer material 130. In one embodiment, for example, the inner layer material 130 may include an active material of the same composition as or a different composition from the active material of the active material sheet 100 of FIG. 26B. The inner layer material 130 may be paste of high viscosity including an active material. The viscosity of the paste may be about 5,000 centipoise (cps), or more or about 10,000 cps or more. The paste may include, for example, $LiMO_2$ where M denotes metal. The M may be any one of Co, Ni and Mn, or a combination of two or more thereof. Since the paste has a high viscosity, the via hole H1 may be easily filled by using the paste. Although the sacrificial layer sheet 120 may include two lines of the inner layer material 130, as shown in FIG. 26E, the formation number, that is, corresponding to the number of the via holes, of the inner layer materials 130 and the formation position of the inner layer materials 130 may be changed in various ways.

Referring to FIG. 26G, the unit structure 110 of FIG. 26C and the sacrificial layer sheet 120 of FIG. 26F, in which the inner layer material 130 is formed, may be repeatedly and alternately stacked one on another. Referring to FIG. 27A, the unit structure 110 may include the two active material sheets 100 and the inner current collecting layer 105 provided between the two active material sheets 100. A plurality of unit structures 110 may be stacked with the sacrificial layer sheet 120 interposed between the unit structures 110. The formation position and/or formation number of the inner layer material 130 included in a first sacrificial layer sheet 120-1 in a stack direction may be different from those of the inner layer material 130 included in a second sacrificial layer sheet 120-2. The formation position and formation number of the inner layer material 130 included in a plurality of sacrificial layer sheets 120 may be appropriately controlled.

FIG. 26H illustrates a stack structure 1100 formed through the stacking process of FIG. 26G. The first stacked structure 1100 may be pressed with a predetermined pressure at a predetermined temperature. In one embodiment, for example, a pressing process may be performed at around a glass transition temperature of a binder material included in the active material sheet 100. In one embodiment, for example, the pressing process may be performed at a temperature of about 80° C. to about 100° C. with a pressure of about 3,000 pounds per square inch (psi) to about 10,000 psi. The pressing process may include, for example, a warm isostatic pressing ("WIP") process.

Next, the inner layer material 130 may be exposed by removing parts of the both end portions of the stack structure 1100. In an embodiment, by removing the both end portions of the stack structure 1100 in a direction parallel to a direction (line direction) in which the inner layer material 130 extends, end portions of the inner layer material 130 may be exposed to side surfaces of the stack structure 1100.

Referring to FIG. 26I, a partition wall layer 210 may be attached to opposite side surfaces of the stack structure 1100. The partition wall layer 210 may include a partition wall sheet 200. The partition wall sheet 200 may be formed from partition wall slurry, and a formation method of the partition wall sheet 200 may be similar to the method of forming the active material sheet 100 of FIGS. 26A and 26B. The partition wall sheet 200 may be formed of a material that is the same as or similar to the material of the active material sheet 100. Referring to FIG. 27C, the partition wall layer 210 may have a stack structure having an inner current collecting layer 205 between the two partition wall sheets 200. The structure of the partition wall layer 210 may be similar to the unit structure 110 shown in FIG. 26C. In one embodiment, for example, the partition wall layer 210 may be attached to opposite side surface of the stack structure 1100 by using the WIP process. The stack structure with the partition wall layer 210 attached to the opposite side surfaces thereof is denoted by reference numeral 1110.

Figure 26J:
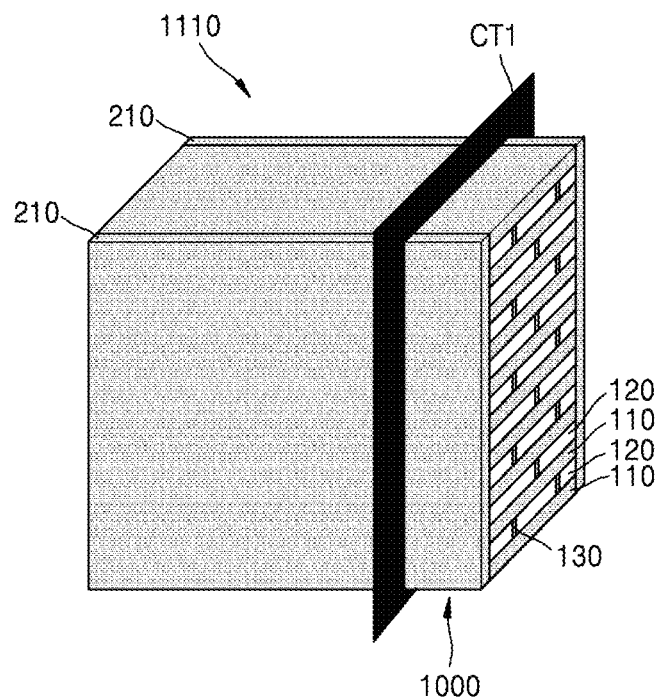

Referring to FIG. 26J, the stacked structure 1110 may be divided into a plurality of divided (cut) first stacked structures 1000 of a desired size (thickness) by using a cutting member CT1. Although FIG. 26J illustrates one of the first stacked structures 1000, a plurality of the first stacked structures 1000 may be obtained by repeating the cutting process. This may be a dicing process on the stacked structure 1110. The cutting process may be performed in a direction parallel to the stacking direction. A blade cutter or wire saw may be used as the cutting member CT1.

Figure 26K:
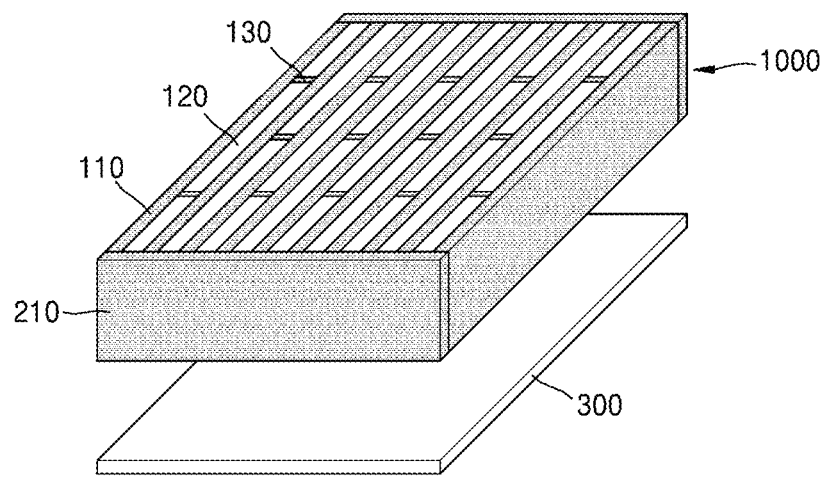
Figure 26L:
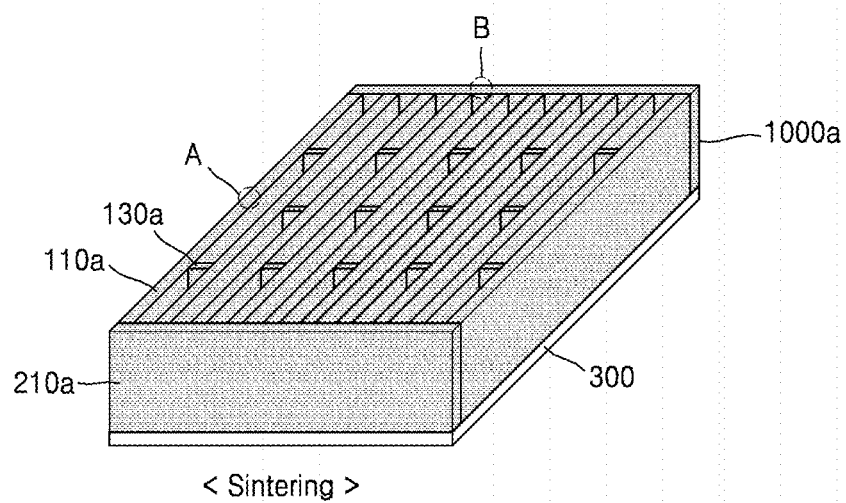
Figure 26M:
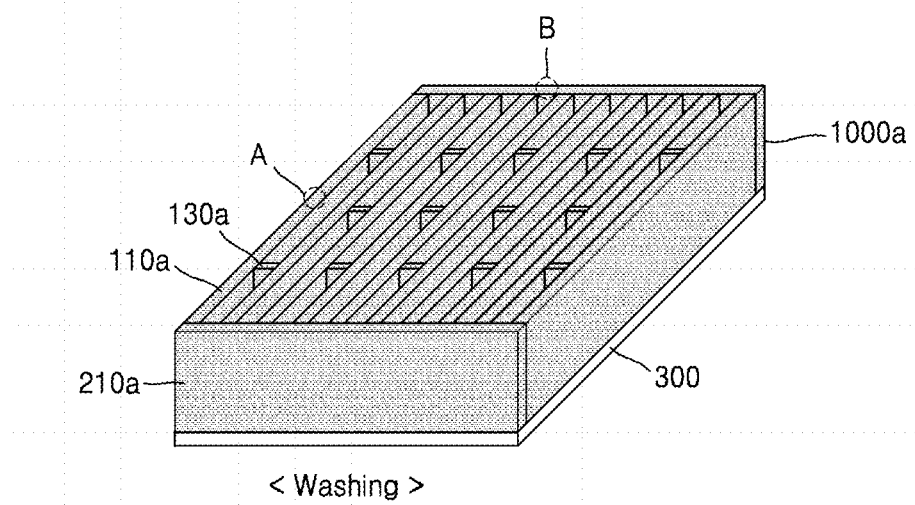

Referring to FIG. 26K, a current collecting layer 300 may be provided on a surface of the first stacked structure 1000. The current collecting layer 300 may include at least one of conductive materials, for example, Cu, Au, Pt, Ag, Zn, Al, Mg, Ti, Fe, Co, Ni, Ge, In, or Pd. The current collecting layer 300 may be a metal layer or may be a layer formed of a conductive material other than a metal. The current collecting layer 300 may be formed by depositing a conductor such as metal on one surface of the first stacked structure 1000. The current collecting layer 300 may be formed by a printing method or other various methods. Furthermore, the current collecting layer 300 may be formed by using the WIP process.

Referring to FIG. 26L, a burn-out or melt-out process may be performed on the sacrificial layer sheet 120 of FIG. 26K, and a sintering process may be performed on the first stacked structure 1000. A reference numeral 1000a denotes a sintered first stacked structure. Furthermore, reference numerals 110a, 130a, and 210a respectively denote a sintered unit structure, a sintered inner layer material (hereinafter, referred to as the inner support layer) and a sintered partition wall layer. Referring to FIGS. 23D and 23E, the sintered unit structure 110a may include a sintered inner current collecting layer 105a between the two sintered active material sheets 100a, and the sintered partition wall layer 210a may include a sintered partition-wall current collecting layer 205a between the two sintered partition wall sheets 200a. The sintering process may be referred to as a co-firing process.

First, the first stacked structure 1000 and the current collecting layer 300 may be heated to an appropriate first temperature, for example, about 500° C. or low, and maintained for an appropriate time period so that the binder material included in the first stacked structure 1000 and the current collecting layer 300 may be removed. Then, the first stacked structure 1000 may be heated to an appropriate second temperature, for example, about 500° C. to about 800° C., and maintained for an appropriate time period so that the sacrificial layer sheet 120 of FIG. 26K may be burned out to be removed. Next, the first stacked structure 1000 may be heated to a sintering temperature of the active material included in the first stacked structure 1000, for example, about 800° C. to about 1200° C., and maintained for a certain time period so that a sintered first stacked structure 1000a may be formed.

The sacrificial layer sheet 120 may be burned out or melted out according to the material of the sacrificial layer sheet 120 of FIG. 26K, and a temperature and maintenance time therefor may be changed. In one embodiment, for example, where the sacrificial layer sheet 120 is formed of a carbon-based material, the sacrificial layer sheet 120 may be removed by the burn-out process. In an alternative embodiment, where the sacrificial layer sheet 120 is formed of $Li_2CO_3$ or LiCl, the sacrificial layer sheet 120 may be removed by the melt-out process. In some embodiments, by directly increasing temperature directly to a sintering temperature of the active material without performing a process of maintaining at an intermediate temperature, the burn-out (or melt-out) process and the sintering process may be simultaneously performed.

Referring to FIG. 26M, a washing process may be performed on the sintered first stacked structure 1000a and the current collecting layer 300. In the washing process, materials remaining after the burn-out or melt-out process, that is, residues, may be removed. The washing process may be performed by using, for example, water or deionized water. The structure of FIG. 26M may correspond to the 3D electrode structure described in FIGS. 1 and 6.

The manufacturing method described with reference to FIGS. 26A to 26M may be changed in various ways. In one embodiment, for example, after the burn-out or melt-out process and the sintering process are performed on the divided (cut) first stacked structure 1000 obtained by the process of FIG. 26J, the process of forming the current collecting layer 300 may be performed. In an alternative embodiment, the sacrificial layer sheet 120 may be removed by using a certain etch solution. In an alternative embodiment, an active material base layer may be further formed between the first stacked structure 1000 and the current collecting layer 300. In such an embodiment, the active material base layer may correspond to the active material base layers AB10 and AB12 shown in FIGS. 14 to 16. The active material base layer AB12 including the active material-metal sintered composite may be formed from active material-metal composite slurry or paste. The active material-metal composite slurry or paste may be formed by mixing an active material ingredient (powder), a metal material (powder), a binder, a dispersing agent, and a plasticizer with a solvent. In an alternative embodiment, one active layer sheet 100 may be used instead of the unit structure 110 of the stack structure of FIG. 26C, and one partition wall sheet 200 may be used instead of the partition wall layer 210 of the stack structure of FIG. 26I. In such an embodiment, the active material plate AP10' and the partition wall WL10' may be formed as shown in FIG. 10. In an alternative embodiment, an active material-metal composite sheet may be used instead of the active material sheet 100 and the partition wall sheet 200. In such an embodiment, the active material plates AP12 and the partition walls WL12 formed of the active material-metal sintered composite as described in FIG. 16 may be formed. In an alternative embodiment, by using a similar method, the inner support layer NS12 of FIG. 16 formed of the active material-metal sintered composite may be formed. Other modification may be possible by various methods.

According to the material of the sacrificial layer sheet 120 of FIG. 26K, the sacrificial layer sheet 120 may be removed by other method, not by the burn-out or melt-out process, in the sintering process of FIG. 26L. In one embodiment, for example, the sacrificial layer sheet 120 may be removed by a selective etching method, which is described with reference to FIGS. 28A to 28C.

Figure 28A:
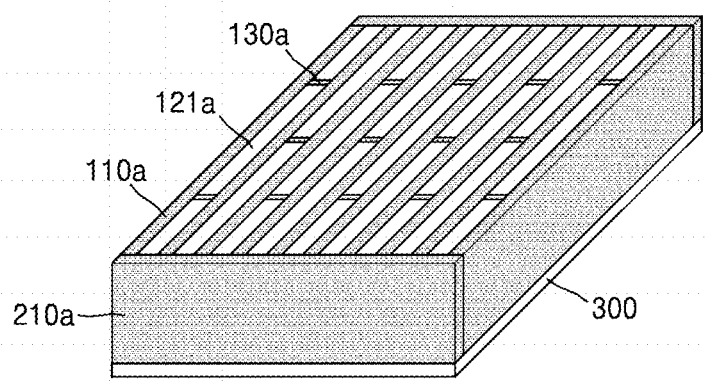
FIGS. 28A to 28C are drawings for explaining a method of manufacturing a 3D electrode structure according to another embodiment.

Referring to FIG. 28A, after a sintering process, a sacrificial layer sheet 121a may remain without being removed. The other structure may be the same as or similar to the structure of FIG. 26L.

Figure 28B:
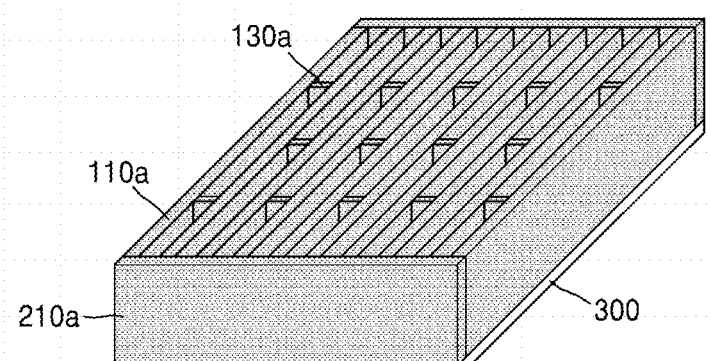

Referring to FIG. 28B, the sacrificial layer sheet 121a of FIG. 28A may be removed by using the selective etching process. In one embodiment, for example, when the sacrificial layer sheet 121a includes a Li-containing oxide such as $Li_2CoSiO_4$, the sacrificial layer sheet 121a may be removed by using an etching solution such as a hydrofluoric acid (HF) solution. In such an embodiment, the HF solution may be a solution in which HF is added to water at a concentration in a range of about 0.5 vol % to about 20 vol %. However, the types of the material of the sacrificial layer sheet 121a and the etching solution presented above are merely exemplary and may be changed in various ways.

Figure 28C:
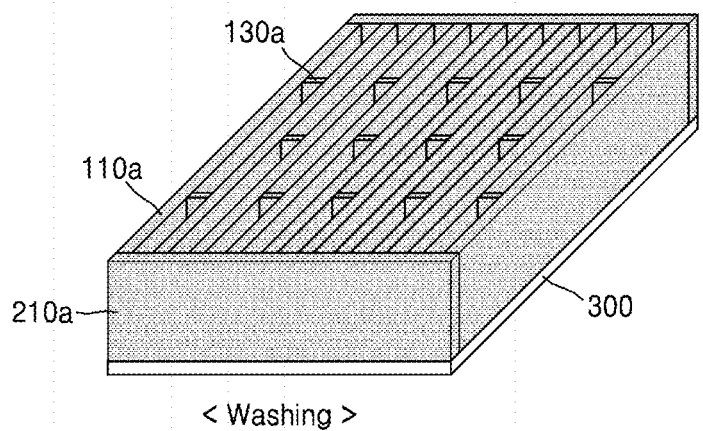

Referring to FIG. 28C, a washing process may be performed on the 3D structure where the sacrificial layer sheet 121a is removed. The washing process may be performed by using, for example, water or deionized water.

Hereinafter, a method of forming an electrode structure including an inner current collecting layer, that is, a support-layer current collecting layer Cn11 in the inner support layers NS11 of FIG. 13, will be described with reference to FIGS. 29A to 29C.

Figure 29A:
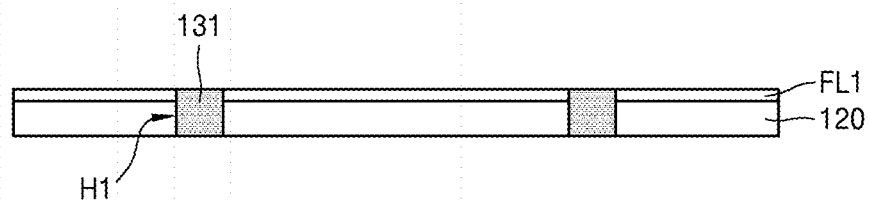
FIGS. 29A to 29C are drawings for explaining a method of manufacturing a 3D electrode structure according to another embodiment.

Referring to FIG. 29A, an inner layer material 131 may be formed in the via hole H1 of the sacrificial layer sheet 120 by using a method similar to the method of FIGS. 26D to 26F. Reference number FL1 denotes a carrier film. In such an embodiment, the inner layer material 131 may be deposited by a PVD method or other methods.

Figure 29B:
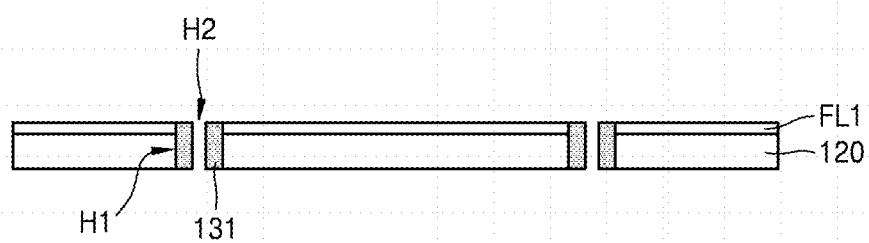

Referring to FIG. 29B, a second via hole H2 may be formed in the inner layer material 131. The second via hole H2 may have a width smaller than that of the via hole (hereinafter, referred to as the first via hole) H1. The second via hole H2 may have a line shape extending along a center portion of the first the via hole H1, when viewed from the above.

Figure 29C:
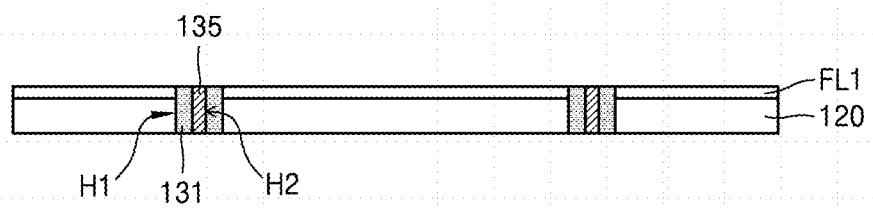

Referring to FIG. 29C, the second via hole H2 may be filled with inner current collecting paste so that an inner current collecting layer 135 may be formed. The inner current collecting layer 135 may include at least one of conductive materials, for example, Cu, Au, Pt, Ag, Zn, Al, Mg, Ti, Fe, Co, Ni, Ge, In, and Pd. The inner current collecting layer 135 may be formed by a method other than the filling method using the paste. After the carrier film FL1 is removed, the sacrificial layer sheet 120 is applied to the stacking process of FIG. 26G, thereby forming a stack structure. Then, a 3D electrode structure may be manufactured by passing through dicing and sintering processes. The inner support layers NS11 of FIG. 13 may be formed from the inner layer material 131, and the support-layer current collecting layer Cn11 of FIG. 13 may be formed from the inner current collecting layer 135. The methods of FIGS. 29A to 29C are merely exemplary and the method of forming an electrode structure including the support-layer current collecting layer Cn11 of FIG. 13 in the inner support layers NS11 of FIG. 13 may be changed in various ways.

The 3D electrode structure described with reference to FIGS. 1 and 6 to 18 may be manufactured by using the method described with reference to FIGS. 26A to 27G, FIGS. 28A to 28C and FIGS. 29A to 29C or other various methods modified therefrom. Then, a secondary battery including the 3D electrode structure may be manufactured. In one embodiment, for example, as described in FIG. 19, a secondary battery may be manufactured by sequentially forming an electrolyte layer, a second active material member, and a second current collecting layer on a manufactured 3D electrode structure ES1. The 3D electrode structure ES1 may have a variety of structures corresponding to the electrode structures described with reference to FIGS. 1 and 6 to 18 or modified therefrom. The manufactured secondary battery may have a structure described in FIGS. 20 to 23 or a variety of structures modified therefrom.

An embodiment of the secondary battery including the 3D electrode structures may be applied to various electronic apparatuses. The electronic apparatus may include mobile devices and wearable devices. The mobile device may include, for example, mobile phones or smartphones, and the wearable device may include, for example, smart watches or smart bands. However, the application fields of the secondary battery are not limited to the mobile phone or smart watch and may be changed very diversely. Furthermore, the secondary battery may be applied to various electronic apparatuses, not to the mobile devices or wearable devices. The secondary battery may be applied to all fields to which existing secondary batteries have been applied. Since the 3D electrode structure according to the embodiment has high energy density, high rate capability, stability, and durability, an electronic apparatus having high power performance may be implemented by using the 3D electrode structure.

Although in the above description many features are discussed in detail, they should be interpreted to be examples of detailed embodiments not limiting the scope of the inventive concept. For example, one of ordinary skill in the art would see that the structures of 3D electrode structure described with reference to FIGS. 1 and 6 to 18 and the secondary battery described with reference to FIGS. 19 to 23 may be modified in various ways. In one embodiment, for example, the formation direction of the active material plates AP10 with respect to the current collecting layer CL10 and the formation direction of the partition wall WL10 or the inner support layer NS10 with respect to the current collecting layer CL10 and the active material plates AP10 may be changed in various ways, and the shapes of the active material plates AP10, the partition wall WL10, and the inner support layer NS10 may be changed in various ways. Furthermore, the method of manufacturing a 3D electrode structure described with reference to FIGS. 26A to 27G, FIGS. 28A to 28C, and FIGS. 29A to 29C and the method of manufacturing a secondary battery employing the 3D structures may be changed in various ways. In addition, the application fields of the 3D electrode structures according to the embodiments may be changed in various ways. Thus, the scope of the inventive concept should be determined not by the above-described embodiments, but by the technical concepts defined in the following claims.

It should be understood that embodiments described herein should be considered in a descriptive sense only and not for purposes of limitation. Descriptions of features or aspects within each embodiment should typically be considered as available for other similar features or aspects in other embodiments.

While some embodiments of the invention have been described with reference to the figures, it will be understood by those of ordinary skill in the art that various changes in form and details may be made therein without departing from the spirit and scope of the invention as defined by the following claims.

What is claimed is:

1. A three-dimensional electrode structure comprising:
   a current collecting layer;
   a plurality of plates electrically connected to the current collecting layer, wherein the plurality of plates is disposed vertically on the current collecting layer, and comprises an active material; and
   a plurality of inner support layers disposed between the plurality of plates,
   wherein the plurality of plates comprises a first plate, a second plate, and a third plate, and
   an inner support layer of the plurality of inner support layers is disposed between the first and second plates,
   another inner support layer of the plurality of inner support layers is disposed between the second and third plates, and
   the inner support layer between the first and second plates and the another inner support layer between the second and third plates are arranged at different positions in a lengthwise direction of the second plate.

2. The three-dimensional electrode structure of claim 1, wherein
   the plurality of inner support layers comprises:
      a first inner support layer disposed between the first and second plates; and
      a second inner support layer disposed between the second and third plates, and
   no inner support layer is arranged at a position corresponding to the first inner support layer in an area between the second and third plates.

3. The three-dimensional electrode structure of claim 2, wherein
   the plurality of inner support layers further comprises a third inner support layer disposed between the first and second plates and spaced apart from the first inner support layer,
   the second inner support layer is arranged at a position between the second and third plates corresponding to an area between the first and third inner support layers, and
   no inner support layer is arranged between the first and third inner support layers in an area between the first and second plates.

4. The three-dimensional electrode structure of claim 1, wherein
   the plurality of plates further comprises a fourth plate,
   another inner support layer of the plurality of inner support layers is disposed between the third and fourth plates,
   the another inner support layer between the third and fourth plates is arranged at a position corresponding to the inner support layer between the first and second plates in a lengthwise direction of the plurality of plates, and
an imaginary straight line connecting a center of the inner support layer between the first and second plates and a center of the another inner support layer between the third and fourth plates is perpendicular to the plurality of plates.

5. The three-dimensional electrode structure of claim 1, wherein
the plurality of plates further comprises a fourth plate,
another inner support layer of the plurality of inner support layers is disposed between the third and fourth plates,
the another inner support layer between the third and fourth plates is arranged to be shifted with respect to the inner support layer between the first and second plates in a lengthwise direction of the plurality of plates, and
an imaginary straight line connecting a center of the inner support layer between the first and second plates and a center of the another inner support layer between the third and fourth plates is inclined to the plurality of plates.

6. The three-dimensional electrode structure of claim 5, wherein
the imaginary straight line connecting the center of the inner support layer between the first and second plates and the center of the another inner support layer between the third and fourth plates is inclined by an angle with respect to the first plate, and
the angle satisfies the following inequality: $70° \leq \theta \leq 90°$, wherein $\theta$ denotes the angle.

7. The three-dimensional electrode structure of claim 1, wherein
the plurality of inner support layers are arranged to form a plurality of columns, and
about 50% or more of the inner support layers in an n-th column of the plurality of columns do not overlap the inner support layers in an (n+1)-th column of the plurality of columns in a lateral direction perpendicular to the plurality of columns.

8. The three-dimensional electrode structure of claim 1, wherein
the plurality of inner support layers are arranged to form a plurality of columns, and
about 50% or more of the inner support layers in an n-th column of the plurality of columns do not overlap the inner support layers in an (n+2)-th column of the plurality of columns in a lateral direction perpendicular to the plurality of columns.

9. The three-dimensional electrode structure of claim 1, wherein each of the plurality of plates has a thickness in a range of about 5 μm to about 100 μm.

10. The three-dimensional electrode structure of claim 1, wherein each of the plurality of plates has a length in a range of about 3 mm to about 30 mm and/or a height in a range of about 50 μm to about 1,000 μm.

11. The three-dimensional electrode structure of claim 1, wherein the plurality of plates are arranged with an interval in a range of about 1 μm to about 100 μm.

12. The three-dimensional electrode structure of claim 1, wherein each of the plurality of inner support layers has a thickness in a range of about 5 μm to about 50 μm.

13. The three-dimensional electrode structure of claim 1, wherein the plurality of inner support layers are arranged with an interval in a range of about 100 μm to about 1,000 μm in a lengthwise direction of the plurality of plates.

14. The three-dimensional electrode structure of claim 1, wherein
the plurality of plates comprise a cathode active material, and
the three-dimensional electrode structure is a cathode structure.

15. The three-dimensional electrode structure of claim 1, wherein
each of the plurality of plates comprises an inner current collecting layer disposed in an inner portion thereof, and
the inner current collecting layer is electrically connected to the current collecting layer.

16. The three-dimensional electrode structure of claim 1, wherein the plurality of inner support layers comprises an active material having a composition, which is the same as or different from an active material of the plurality of plates, or a non-active material.

17. The three-dimensional electrode structure of claim 1, wherein
each of the plurality of inner support layers comprises an inner current collecting layer disposed in an inner portion thereof, and
the inner current collecting layer is electrically connected to the current collecting layer.

18. The three-dimensional electrode structure of claim 1, further comprising:
a partition wall disposed vertically on the current collecting layer and arranged perpendicular to the plurality of plates to support the plurality of plates, and
the partition wall is disposed outside the plurality of plates.

19. The three-dimensional electrode structure of claim 1, further comprising:
a base layer disposed between the current collecting layer and the plurality of plates, and comprising an active material.

20. The three-dimensional electrode structure of claim 19, wherein
the base layer comprises an active material-metal sintered composite,
the active material-metal sintered composite comprises at least one selected from Al, Cu, Ni, Co, Cr, W, Mo, Ag, Au, Pt and Pd, and
a content of the metal in the active material-metal sintered composite is in a range of about 1 vol % to about 30 vol %.

21. A secondary battery comprising:
a first electrode structure;
a second electrode structure arranged spaced apart from the first electrode structure; and
an electrolyte disposed between the first electrode structure and the second electrode structure,
wherein the first electrode structure comprises the three-dimensional electrode structure of claim 1.

22. The secondary battery of claim 21, wherein
the first electrode structure is a cathode structure, and
the second electrode structure is an anode structure.

23. The secondary battery of claim 21, wherein
the first electrode structure comprises a plurality of first plates including a first active material,
the second electrode structure comprises a plurality of second plates including a second active material, and
the plurality of first plates and the plurality of second plates are alternately arranged with each other.

24. The secondary battery of claim 21, wherein
the first electrode structure, the electrolyte and the second electrode structure constitute a battery cell, and
the secondary battery has a structure in which a plurality of the battery cells are stacked on one another.

* * * * *